United States Patent [19]
Goto

[11] Patent Number: 5,424,528
[45] Date of Patent: Jun. 13, 1995

[54] FOCUS DETECTING DEVICE HAVING AT LEAST THREE REIMAGING LENSES

[75] Inventor: Hisashi Goto, Yokohama, Japan

[73] Assignee: Olympus Optical Co., Ltd., Tokyo, Japan

[21] Appl. No.: 140,548

[22] Filed: Oct. 25, 1993

[30] Foreign Application Priority Data

Oct. 30, 1992 [JP] Japan .................................. 4-292987
Mar. 23, 1993 [JP] Japan .................................. 5-064084

[51] Int. Cl.6 ............................................. G01J 1/20
[52] U.S. Cl. .................................. 250/201.8; 354/408
[58] Field of Search ...................... 250/201.8, 204; 354/408; 359/626, 619

[56] References Cited

U.S. PATENT DOCUMENTS

| | | | |
|---|---|---|---|
| 4,959,677 | 9/1990 | Suda et al. | |
| 5,245,175 | 9/1993 | Inabata | 250/201.8 |
| 5,257,062 | 10/1993 | Moriyama | 354/408 |
| 5,321,248 | 6/1994 | Sensui | 250/201.8 |

FOREIGN PATENT DOCUMENTS

| | | |
|---|---|---|
| 55-118019 | 9/1980 | Japan . |
| 58-106511 | 6/1983 | Japan . |
| 60-32012 | 2/1985 | Japan . |
| 63-264715 | 11/1988 | Japan . |
| 4240813 | 8/1992 | Japan . |

*Primary Examiner*—David C. Nelms
*Attorney, Agent, or Firm*—Cushman, Darby & Cushman

[57] ABSTRACT

A focus detecting device includes a condenser lens, an aperture stop with a plurality of openings, a plurality of reimaging lenses, and light receiving element arrays. Focus detection is performed by detecting the phase difference between two output signals derived from the light receiving element arrays. The vertices of the reimaging lenses are situated on a line connecting the centers of the openings, and light beams are conducted through the reimaging lenses corresponding thereto to the light receiving element arrays. Thus, the focus detecting device is capable of extending the focus detecting area and improving the focusing accuracy.

8 Claims, 19 Drawing Sheets

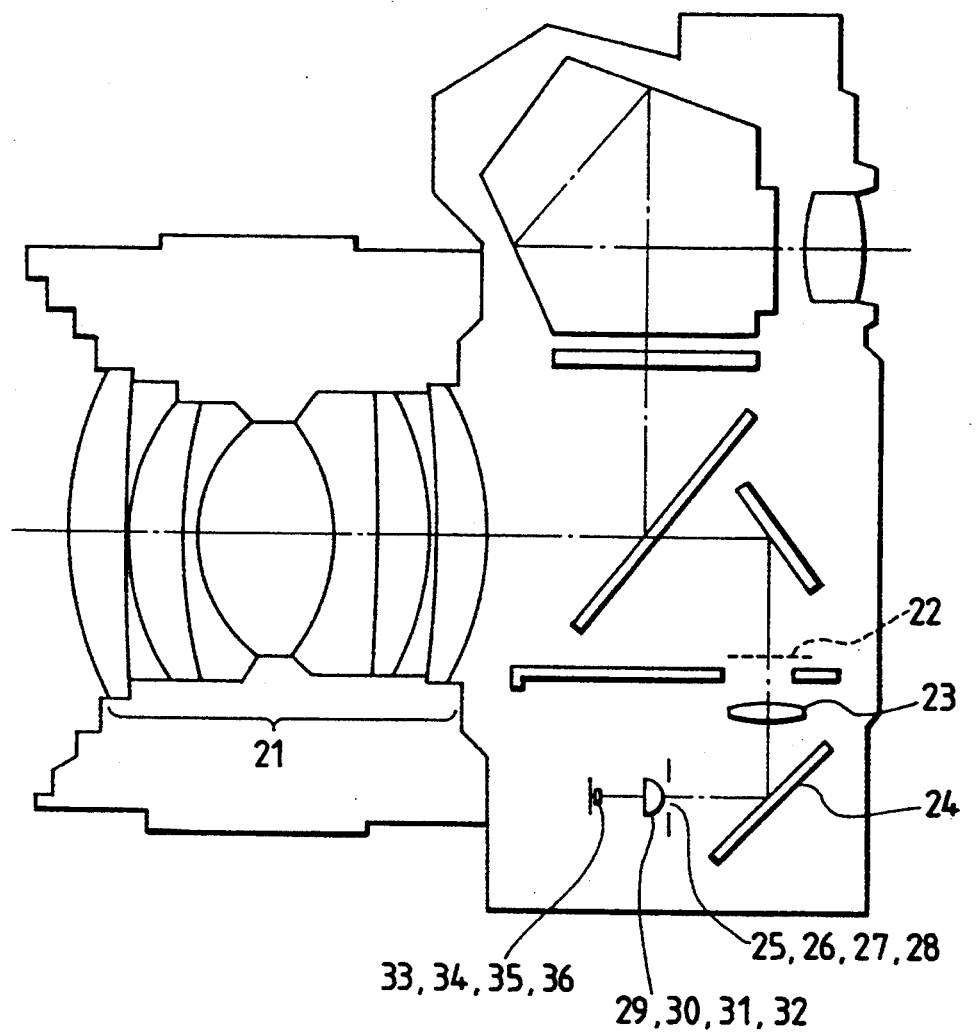

REIMAGING SYSTEM A

REIMAGING SYSTEM B

REIMAGING SYSTEM C

FOCUS DETECTING DEVICE HAVING AT LEAST THREE REIMAGING LENSES

BACKGROUND OF THE INVENTION

1. Field of tile Invention

This invention relates to a focus detecting device for use in cameras.

2. Description of the Related Art

In the past, many focus detecting optical systems have been proposed, each of which is such that an image formed by a photographic lens is divided into two, symmetrical with respect to a plane including its optical axis, by a reimaging optical system, which are re-formed on photoelectric converting element arrays (light receiving element arrays), and the positional shift between these two images is detected to thereby perform focus detection. These proposed devices are set forth, for example, in Japanese Patent Preliminary Publication Nos. Sho 55-118019, Sho 58-106511, and Sho 60-32012. Any of them is designed so that the amount of light through the reimaging optical system is received by the light receiving element arrays in a line, and their output signals are used for focus detection.

In the focus detecting (optical) system, the light receiving element array is such that light receiving elements are in general arrayed at regular intervals. When the distance between two light receiving elements adjacent to each other is taken as one pitch, focusing accuracy is represented as a relative measure for one pitch. Now, when focusing accuracy is assumed to be 1/M (where M is a constant) of one pitch and the amount of defocus per pitch at the image plane is denoted by $\alpha$, a focusing accuracy $\Delta$ at the image plane is defined as $$\Delta = \pm(1/M)\, \alpha(tm) \quad (1)$$

Here, focusing accuracy degrades with increasing value $\Delta$ and becomes high with decreasing it. In other words, the greater the value of the constant M, the higher the focusing accuracy. The constant M is determined by the coincidence of two images being compared on the light receiving element arrays and the accuracy of calculation for detecting the correlation (the amount of phase shift). The increase of the number of light receiving elements used to detect the correlation (the amount of phase shift) results in improved calculation accuracy. In a camera system requiring the constant M of 10 or more, for example, when the phase difference is detected in correlation with the output corresponding to 20 elements, it is required that the coincidence of the images on the light receiving clement arrays is excellent compared with the case of 0.1 times the pitch on the 20 elements (the length 20 times the pitch), provided the calculation accuracy is sufficient. This is 0.005 times the pitch in terms of one element.

When the number of light receiving elements of the tight receiving element array is taken as N (a constant), a detectable defocus area $\Sigma$ (which is hereinafter referred to as a focus detecting area $\Sigma$) at the image plane is expressed by $$\Sigma = |\pm N\, \alpha| \quad (2)$$

In Eqs. (1) and (2), if the amount of defocus is increased, the focus detecting area $\Sigma$ will be large but the focusing accuracy $\Delta$ will be poor. Conversely, if the amount of defocus $\alpha$ is decreased, the focusing accuracy $\Delta$ will be improved but the focus detecting area $\Sigma$ will be diminished. Thus, the focus detecting area $\Sigma$ and the focusing accuracy $\Delta$ are affected, opposite to each other, by the amount of defocus $\alpha$ per pitch at the image plane. It follows from this that the extension of the focus detecting area $\Sigma$ and the improvement of the focusing accuracy $\Delta$ are incompatible with each other.

In order to solve the above problem, the use of a plurality of focus detecting systems is proposed by U.S. Pat. No. 4,959,677 and Japanese Patent Preliminary Publication Nos. Sho 63-264715 and Hei 4-240813. Referring now to FIGS. 1 to 7, the proposal of U.S. Pat. No. 4,959,677 is explained in some detail. FIG. 1 shows the case where a focus detecting device is situated on the bottom of the body of a single-lens reflex camera. FIG. 2 shows focus detecting systems orthogonal to each other. FIG. 3 depicts essential parts of one of the focus detecting systems. FIG. 4 depicts essential parts of the other, which is rotated 90° about the optical axis with respect to FIG. 3.

In these diagrams, reference numeral 1 represents a photographic lens; 2 a preset imaging plane; 3 a condenser lens disposed adjacent to the preset imaging plane 2; and 4 an aperture stop. The aperture stop 4 is located behind the condenser lens 3 and includes openings, four in total, arranged in directions perpendicular to each other, one pair in each, with a space sufficient to ensure focusing accuracy. Reference numeral 5 denotes a separator lens. The separator lens 5 is situated behind the aperture stop 4 with two pairs of openings and includes reimaging lenses, four in total, arranged in directions perpendicular to each other, one pair in each, to correspond to individual openings. Numerals 6 and 7 denote two pairs of light receiving element arrays disposed in directions normal to each other. The light receiving element arrays 6 and 7 are located at the imaging positions of light beams emerging from the separator lens 5.

FIGS. 5, 6, and 7 show the aperture stop 4, the separator lens 5, and the light receiving element arrays 6 and 7, respectively, viewed along the direction of the optical axis. The light beams passing through individual openings of the aperture stop 4 are independent of one another. The optical components described above constitute the focus detecting device.

In the focus detecting device of U.S. Pat. No. 4,959,677, the focus detecting systems perpendicular to each other are respectively taken as a focus detecting system I and a focus detecting system II. The amount of defocus $D_1$ detected by the focus detecting system I and the amount of defocus $D_2$ detected by the focus detecting system II are given by $$D_1 = (F_{W1}/\beta)\, P_1 \quad (3)$$

$$D_2 = (F_{W2}/\beta)\, P_2 \quad (4)$$

where $P_1$ is the amount of phase difference of the images on the light receiving clement arrays of the focus detecting system I, $P_2$ is the amount of phase difference of the images on the light receiving element arrays of the focus detecting system II, $\beta$ is the imaging magnification of the focus detecting systems I and II, $F_{W1}$ is the F number of the barycentric beam to be detected in the focus detecting system I, and $F_{W2}$ is the F number of the barycentric beam to be detected in the focus detecting system II. Here, the term "barycentric beam" means the light beam defined by rays passing through the center of each opening of the aperture stop. Thus, proper settings of the F numbers $F_{W1}$ and $F_{W2}$ and the magnification $\beta$ of the focus detecting systems I and II allow the constructions of the focus detecting system I which is somewhat low in focusing accuracy but large in focus detecting area, and the focus detecting system II which is smaller in focus detecting area but higher in focusing accuracy. In this way, the focus detecting device can be derived in which the extension of the focus detecting area and the improvement of the focusing accuracy are compatible with each other.

Using FIG. 8, reference is made to the proposal of Japanese Publication No. Sho 63-264715. FIG. 8 shows the focus detecting device in which two focus detecting systems are juxtaposed which involve a TTL phase difference technique set forth in this publication. There are the condenser lens 3 disposed adjacent to the preset imaging plane 2, and a half mirror 8 and a reflecting mirror 9 which are situated behind the condenser lens 3. On the optical path reflected from the half mirror 8 are arranged an aperture stop 4a having a pair of openings juxtaposed, normal to the plane of the page, at a distance sufficient to ensure focusing accuracy; a pair of separator lenses 5a disposed behind the aperture stop 4a having a pair of openings; and light receiving element arrays 6 placed at imaging positions of light beams emerging from the separator lenses 5a. On the optical path transmitted through the half mirror 8 and reflected from the reflecting mirror 9, on the other hand are arranged an aperture stop 4b having a pair of openings juxtaposed, normal to the plane of the page, at a distance sufficient to ensure focusing accuracy; a pair of separator lenses 5b disposed, normal to the plane of tile page, behind the aperture stop 4b having a pair of openings; and light receiving element arrays 7 placed at imaging positions of light beams emerging from the separator lenses 5b. These optical components constitute the focus detecting device.

In the focus detecting device of Publication No. Sho 63-264715, two juxtaposed focus detecting systems are respectively taken as the focus detecting system I and the focus detecting system II. When the amount of phase difference of the images on the light receiving element arrays is represented by P, the F number of the barycentric beam to be detected is represented by $F_w$, and the projecting magnification of one focus detecting system is denoted by $\beta$, the amount of defocus D to be detected is given by $D=(F_w/\beta)P$. Consequently, the amounts of defocus detected by the focus detecting systems I and II are expressed by $$D_1 = (F_{W1}/\beta_1) P_1 \qquad (5)$$

$$D_2 = (F_{W2}/\beta_2) P_2 \qquad (6)$$

Even in the case where the light receiving element arrays are arranged on the same plane, this focus detecting device is designed to be able to set arbitrarily the spaces between the condenser lens and the separator lenses, and between the separator lenses and the light receiving element arrays so that the projecting magnifications $\beta_1$ and $\beta_2$ of the focus detecting systems are made different from each other. Consequently, the focus detecting device is constructed with the focus detecting system I which is somewhat low in focusing accuracy but large in focus detecting area, and the focus detecting system II which is smaller in focus detecting area but higher in focusing accuracy. The focus detecting device can thus be brought about in which the extension of the focus detecting area and the improvement of the focusing accuracy are compatible with each other.

Also, Japanese Publication No. Hei 4-240813 proposes to increase the amount of light incident on the light receiving element arrays by switching over the optical path to another.

As explained in connection with FIGS. 1 to 8, the focus detecting device can be made to satisfy both the extension of the focus detecting area and the improvement of the focusing accuracy. In the case of the focus detecting device including the aperture stop of configuration shown in FIG. 5, however, its opening section cannot be made larger. This results in the reduction of the amount of light reaching the light receiving element arrays and the deterioration of the focusing accuracy. Specifically, If the opening section of the focus detecting system I is made larger, that of the focus detecting system II must be made smaller. For increasing the amount of light reaching the light receiving element arrays, It is only necessary to construct the aperture stop 4 of configuration shown In FIG. 9. The use of such an aperture stop, however, leads to a small difference between the F number $F_{W1}$ of the barycentric beam to be detected in the focus detecting system I and the F number $F_{W2}$ of that in the focus detecting system II. This defeats the primary purpose of satisfying both the extension of the focus detecting area and the improvement of the focusing accuracy.

As shown In FIG. 8, even though light is split up by the half mirror to travel along two focus detecting systems, the amount of light reaching the light receiving element arrays will decrease. Further, the arrangement, set forth in Publication No. Hei 4-240813, for increasing the amount of light incident on the light receiving element arrays by switching over the optical path needs moving members and the resultant space and driving power. Moreover, the application of these means to the focus detecting device causes increase of the total area of light receiving element arrays, followed by reduction of the workability of light receiving elements and bulkiness of the entire focus detecting system. Thus, this arrangement affects the compactness of the entire camera. The focus detecting device of the type has many problems such that adjustments are required for the half mirror dividing light to follow the focus detecting systems I and II, the path switching members, and Individual parts of the focus detecting systems I and II; the mechanism is complicated; and the assembly is troublesome.

In the conventional focus detecting device in which a pair of openings (entrance pupils) is disposed to be nearly equidistant from the optical axis of the condenser lens, If the reimaging lenses of identical shape are provided to be nearly equidistant from the optical axis of the condenser lens, particularly significant light beams from an object adjacent to the optical axis will likewise undergo the same refraction. Although the refraction changes progressively In separating from the optical axis if the extent of this change is made symmetrical, the focusing of the images in an in-focus state can easily be improved.

However, some camera systems need an arrangement such that the entrance pupils of the focus detecting systems are asymmetrical with respect to the optical axis of the photographic lens. One of its specific examples will be given below.

In FIGS. 10A and 10B, reference numeral 11 denotes a finder section; 12 a photographic lens section; 13 a focus detecting device section; 14 a screen mat; 15 a mirror box; 16 an imaging plane; 17 a main mirror; and 18 a field stop. Reference symbol BM represents a sub-mirror. Where the entrance pupils of the focus detecting systems are arranged vertically in order to improve the focusing accuracy of an object in a horizontal direction, as shown in FIG. 10A, it is necessary to extend the field stop 18 in a lateral direction of the plane of the figure. Further, in order to provide the sub-mirror BM for introducing a beam of light into the field stop 18, there is the necessity of enlarging the mirror box 15.

On the other hand, FIG. 10B illustrates the case where the entrance pupils are arranged horizontally and the field stop 18 need not be extended. If the mirror box 15 is enlarged, not only does the entire camera body become larger, but the last surface of tile photographic lens must be located farther away from the imaging plane 16. This causes problems such as the oversizing of the photographic lens, the complication of the arrangement, and the degradation of imaging performance. Furthermore, there is a systematic problem of defeating the mounting of the photographic lens in which the distance between the last surface of the photographic lens and the imaging plane 16, although enough for a common camera body, is insufficient for the above camera system. Consequently, in the conventional camera system in which the entrance pupils of the focus detecting systems are arranged vertically, provision has been made to prevent the enlargement of the mirror box 15 in such a way as to diminish the NA of the light beam entering the focus detecting systems through the photographic lens, the focus detecting field, or the amount of detectable defocus. If, however, the entrance pupils of the focus detecting systems are arranged to be asymmetrical about the optical axis of the photographic lens, it will be possible to ensure the NA of the light beam from the photographic lens, the focus detecting field, and the amount of detectable defocus, without enlarging the mirror box 15.

In the optical system Including the condenser lens and the reimaging lens which have the same power, if the decentering relation between these two lenses is different from that between the opening section and the condenser lens, the conditions of incidence and emergence of light beams from the object will change. Thus, the effects of the reimaging system on the light beams vary, with the result that the coincidence between the images becomes incomplete even in the in-focus state. That is, the detecting accuracy of the phase difference degrades. Specifically, the images formed on individual light receiving element arrays in the same plane vary in size. The disagreement between tile images caused by the differences of distortion (aberration) of the images is corrected even in the conventional focus detecting optical system, as described later.

Next, reference is made to the functions of optical elements of the conventional focus detecting optical system and its degree of freedom for correction. The principal functions of the condenser lens in the conventional focus detecting optical system are (1) to perform the pupil transmission in the so-called relay optical system whose focal length is determined by the specification, and (2) to correct the distortion of the images on individual light receiving element arrays. The configuration of the condenser lens is practically determined by these two functions, and the number of degrees of other freedom is highly limited. On the other hand, the function of the reimaging lens in the focus detecting optical system is to determine where the image formed once at the preset imaging plane should be re-formed, and in the case of a simple optical system, the number of degrees of other freedom is highly limited. It is not easy that the above functions is added to individual optical elements so that the function of coincidence of two images is further added, that is, the images on the light receiving element arrays are made to coincide in size with each other. Further, if the number of lens elements is increased to complicate the arrangement, there will be the possibility that the coincidence of two images is improved, but error factors will be increased. This is unfavorable in view of assembly tolerance and adjusting means in particular.

SUMMARY OF THE INVENTION

It is, therefore, a primary object of the present invention to provide a focus detecting device in which both the extension of the focus detecting area and the improvement of the focusing accuracy are satisfied, a photographic lens of a relatively large F number is applicable, a sufficient amount of light can be supplied to the light receiving element arrays, its size is compact, and its mounting is easy.

Another object of the present invention is to provide a focus detecting device which is easy to assemble and brings about an excellent coincidence between the images on the light receiving element arrays even when the entrance pupils of the focus detecting systems are arranged to be asymmetrical with respect to the optical axis of the photographic lens.

The focus detecting device according to the present invention comprises a condenser lens disposed adjacent to a preset imaging plane of a photographic lens, an aperture stop having four openings arranged at distances sufficient to ensure the focusing accuracy, four reimaging lenses, and photoelectric converting means composed of light receiving element arrays. By receiving the intensity distribution of four beams of light passing through different regions of the photographic lens by the photoelectric converting means, and detecting a phase difference between two of the output signals which represent the intensity distribution of light derived from the photoelectric converting means, focus detection can be performed. Further, the centers of the four openings are arranged in a line, and the four beams of light passing through the different regions of the photographic lens and traversing at least one point in the preset imaging plane are introduced through the corresponding reimaging lenses into the photoelectric converting means.

By detecting the phase difference between the output signals representative of the intensity distribution derived from two beams of light which pass through a region close to the optical axis of the photographic lens, the focus detection becomes possible In which the focusing accuracy is somewhat low, but the detectable defocus area at the imaging plane is broad. On the other hand, by detecting the phase difference between the output signals representative of the intensity distribution derived from the other two beams of light which pass through another region farther from the optical axis of the photographic lens, the focus detection can be performed in which the detectable defocus area at the image plane is narrower, but the focusing accuracy is higher. Thus, even though the opening section of the aperture stop is extended perpendicular to the direction in which the four openings are arranged, the F number Fw of the barycentric beam in the focus detecting systems remains unchanged. Specifically, the focus detecting device can be constructed in which the purpose of satisfying both the extension of the focus detecting area and the improvement of the focusing accuracy is achieved, while the opening area of the aperture stop increases, the amount of light incident on the light receiving element arrays is great, and notably in low luminance, focus detecting accuracy is high.

Further, four directions of positional shifts of the images due to defocus are parallel to one another. Since the preset imaging plane of the photographic lens used in common is evaluated for in-focus, it is also possible to improve the focusing accuracy under various conditions by detecting at least two kinds of phase differences. For example, by adding two kinds of output signals to detect the phase difference, it also becomes possible to increase the amount of light which is substantially incident on the light receiving element arrays and evaluated so that the focusing accuracy in low luminance is further improved. Moreover, the pitch of the light receiving elements for incidence of two beams of light passing through a region close to the optical axis of the photographic lens is made different from that of the light receiving elements for incidence of the other two beams of light passing through another region farther from the optical axis of the photographic lens. In this way, the focus detecting device can also be designed which is peculiarly suitable for the so-called aliasing phenomenon.

The focus detecting device according to the present invention has at least two reimaging systems for ensuring focusing accuracy which include a condenser lens disposed adjacent to a preset imaging plane of a photographic lens, an aperture stop having openings corresponding to entrance pupils, reimaging lenses, and photoelectric converting means composed of light receiving element arrays corresponding to individual openings. Focus detection is performed by detecting the phase difference between two output signals which are representative of the intensity distribution of light derived from the photoelectric converting means of two reimaging systems for ensuring focusing accuracy, of the foregoing reimaging systems, corresponding to two entrance pupils. In addition, at least one of combinations of the reimaging systems for detecting the phase difference between the two output signals has the entrance pupils disposed at different distances from the optical axis of the condenser lens, and the pitches of the elements of the light receiving element arrays corresponding to the reimaging systems are different from each other.

Hence, the light beams emanating from the object to be focused are introduced into the preset imaging plane by the photographic lens, and are formed at the preset imaging plane if the photographic lens is in an in-focus condition. The light beams having traversed the preset imaging plane are incident on the reimaging systems as if they have passed through the corresponding entrance pupils. The light beams are conducted, through the condenser lens, openings, and reimaging lenses, to the light receiving element arrays. In this case, the reimaging systems having the entrance pupils disposed at different distances from the optical axis of the condenser lens project various size of object image on the light receiving element arrays, because the light beams are incident at different positions and angles on the lens elements and undergo different refractions. Since the pitch of elements of each light receiving element array varies with the size of the object image to be projected, the output signal is derived such that the object of identical size is projected. The dimension of the elements perpendicular to the light receiving element array may well be set in the same manner.

Further, the focus detecting device according to the present invention is designed so that at least one of combinations of the reimaging systems for detecting the phase difference between the two output signals has the entrance pupils disposed at different distances from the optical axis of the condenser lens, and corrections are added to the output signals as though the pitches of the elements of the light receiving element arrays corresponding to the reimaging systems are different from each other for detection of the phase difference between the two output signals.

Hence, the light beams emanating from the object to be focused are introduced into the preset imaging plane by the photographic lens, and are formed at the preset imaging plane if the photographic lens is in an in-focus condition. The light beams having traversed the preset imaging plane are incident on the reimaging systems as if they have passed through the corresponding entrance pupils. The light beams are conducted, through the condenser lens, openings, and reimaging lenses, to the light receiving element arrays. In this case, the reimaging systems having the entrance pupils disposed at different distances from the optical axis of the condenser lens project various size of object image on the light receiving element arrays, because the light beams are incident at different positions and angles on the lens elements and undergo different refractions. Even in the state where the output signals from the light receiving element arrays have to coincide with each other, the output signals varying with the sizes of the images to be projected are obtained. The output signals thus available are compressed or expanded along the light receiving element arrays in accordance with the sizes of the images to be projected, and the same phase difference as in the output signals where the images of identical size are projected can be detected. The intensity levels of the output signals may well be set in the same manner.

Alternatively, the focus detecting device according to the present invention is constructed so that at least one of combinations of the reimaging systems for detecting the phase difference between the two output signals has the entrance pupils disposed at different distances from the optical axis of the condenser lens, and the optical paths from the rear principal points of the reimaging lenses to the light receiving element arrays are different in length from one another.

Hence, the light beams emanating from the object to be focused are introduced Into the preset imaging plane by the photographic lens, and are formed at the preset imaging plane if the photographic lens is in an in-focus condition. The light beams having traversed the preset imaging plane are incident on the reimaging systems as if they have passed through the corresponding entrance pupils. The light beams are conducted, through the condenser lens, openings, and reimaging lenses, to the light receiving element arrays. In this case, the reimaging systems having the entrance pupils disposed at different distances from the optical axis of the condenser lens exert different refractions on the light beams, because the light beams are incident at different positions and angles on the lens elements. Further, the optical path lengths between the rear principal points of the reimaging lenses and the light receiving element arrays vary with refractions the light beams have undergone, and upon in-focus, the object images of identical size are projected on the light receiving element arrays. Here, when the light receiving element arrays are provided on the same plane, this arrangement is favorable for the cost, assembly, and compactness of the whole of the light receiving element arrays. Specifically, this can be accomplished by varying the distances between the principal points of the reimaging lenses; changing the thicknesses of the reimaging lenses; Interposing media, such as plane-parallel plates, of different lengths, between the reimaging lenses and the light receiving element arrays (however, for the reimaging system of the greatest path length, the medium need not be interposed); or varying the thicknesses of cover glass (resin) on the light receiving element arrays.

These and other objects as well as the features and advantages of tile present invention will become apparent from the following detailed description of the preferred embodiments when taken In conjunction with the accompanying drawings.

BRIEF DESCRIPTION OF THE DRAWINGS

FIG. 11 is a view showing a state where a first embodiment of a focus detecting device according to the present invention is disposed in a camera;

DETAILED DESCRIPTION OF THE PREFERRED EMBODIMENTS

Figure 1:
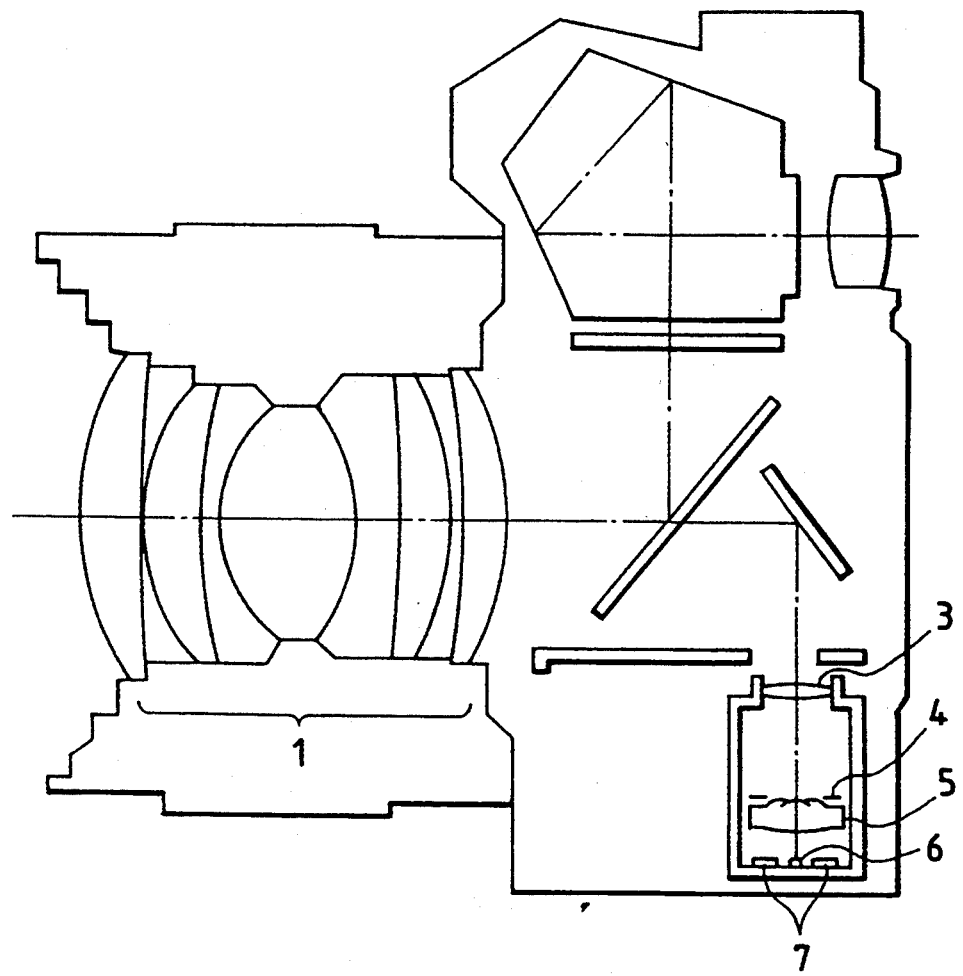
FIG. 1 is a view showing a state where a focus detecting device of the prior art is disposed in a camera.
Figure 2:
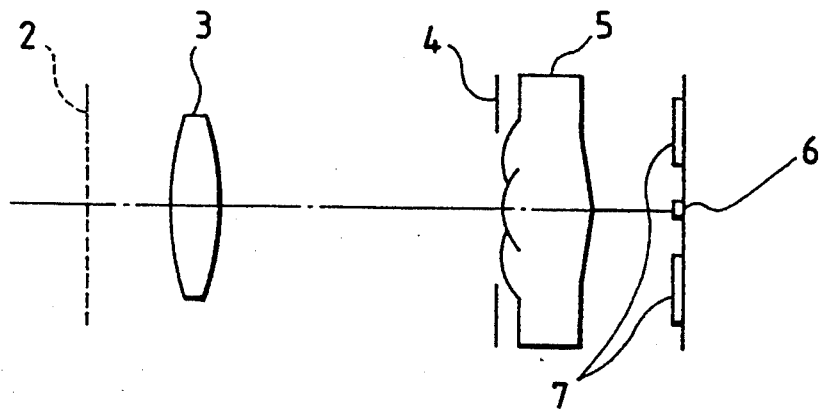
FIG. 2 is a view showing the arrangement of a binary focus detecting system of the focus detecting device in FIG. 1.
Figure 3:
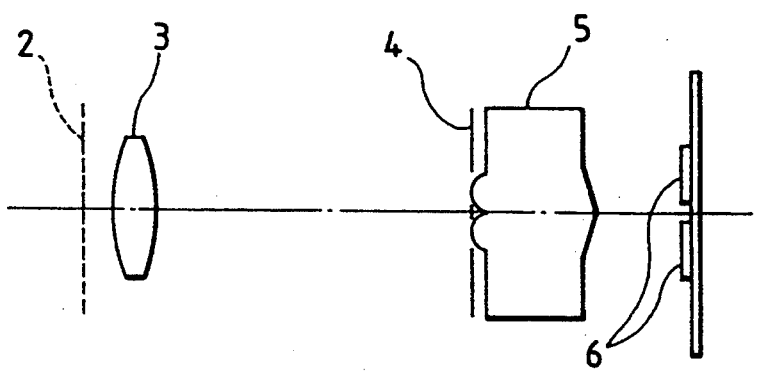
FIG. 3 is a view showing the arrangement of one focus detecting system of the binary focus detecting system In FIG. 2.
Figure 4:
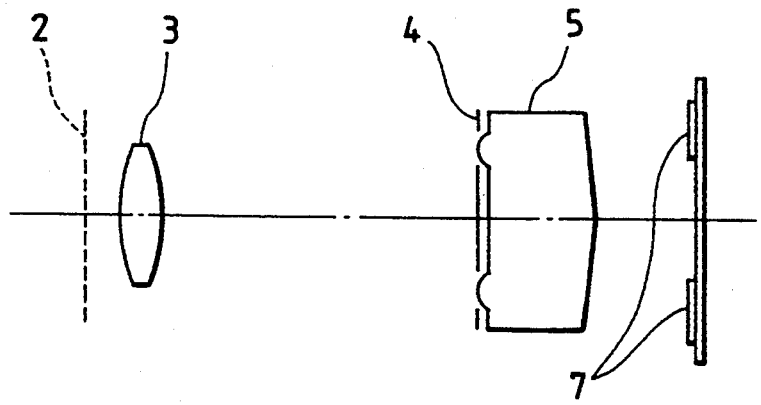
FIG. 4 is a view showing the arrangement of the other focus detecting system of the binary focus detecting system in FIG. 2.

Referring to the drawings, the embodiments of the present invention will be explained in detail below.

Figure 12:
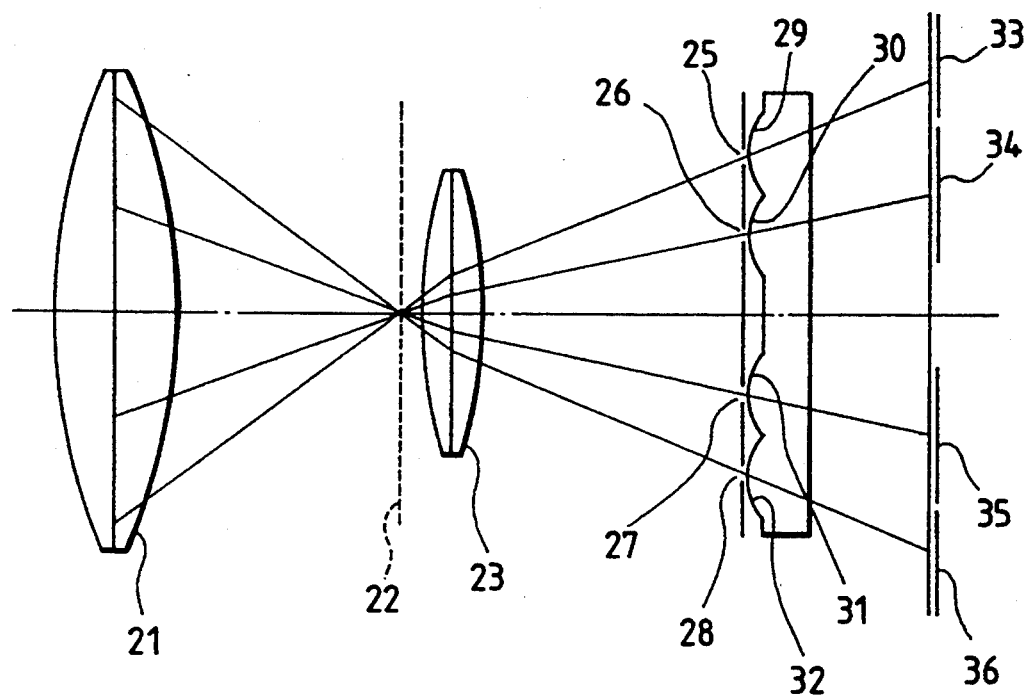
FIG. 12 is a view showing the arrangement of focus detecting systems in the first embodiment.
Figure 13:
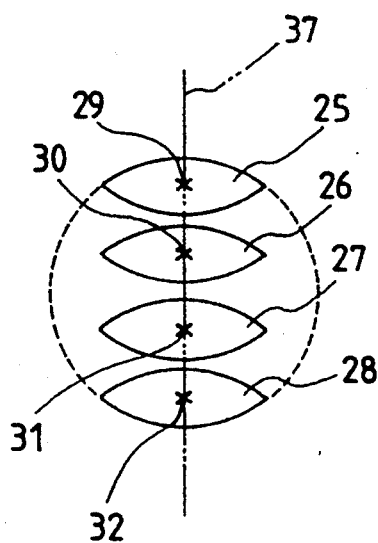
FIG. 13 is a view showing the configuration of openings and reimaging lenses of the focus detecting systems in FIG. 12, viewed along the direction of the optical axis of a condenser lens.

FIGS. 11 to 13 show the first embodiment of the focus detecting device according to the present invention. In FIG. 11, the focus detecting device includes a condenser lens 23 disposed adjacent to a preset imaging plane 22 of a photographic lens 21; a mirror 24 disposed behind the condenser lens 23; four openings 25, 26, 27, and 28 situated behind the mirror 24 and arranged perpendicular to the plane of the figure, constituting an aperture stop; four reimaging lenses 29, 30, 31, and 32 corresponding to the four openings 25, 26, 27, and 28 and arranged perpendicular to the plane of the figure; and light receiving element arrays 33, 34, 35, and 36 which constitute a photoelectric converting means, arranged in the neighborhood of the imaging positions of light beams emerging from the reimaging lenses 29, 30, 31, and 32. In FIG. 11, light receiving elements are arrayed normal to the plane of the figure.

Figure 5:
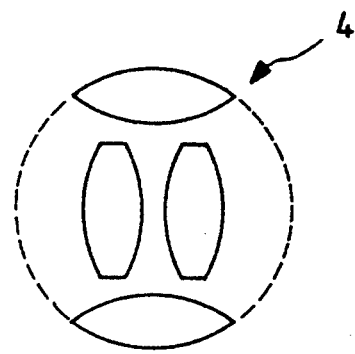
FIGS. 5, 6, and 7 are views showing an aperture stop, a separator lens, and light receiving element arrays, respectively, viewed along the direction of an optical axis, of the binary focus detecting system in FIG. 2.
Figure 6:
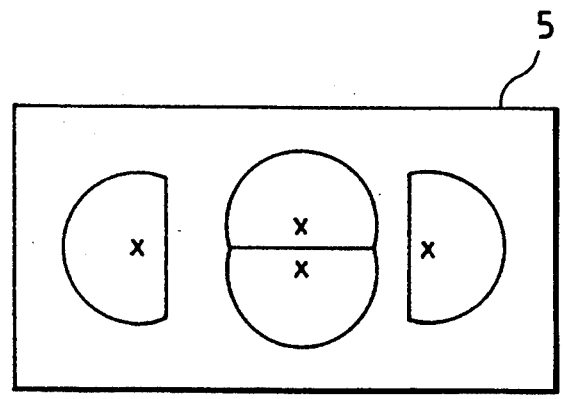
Figure 7:
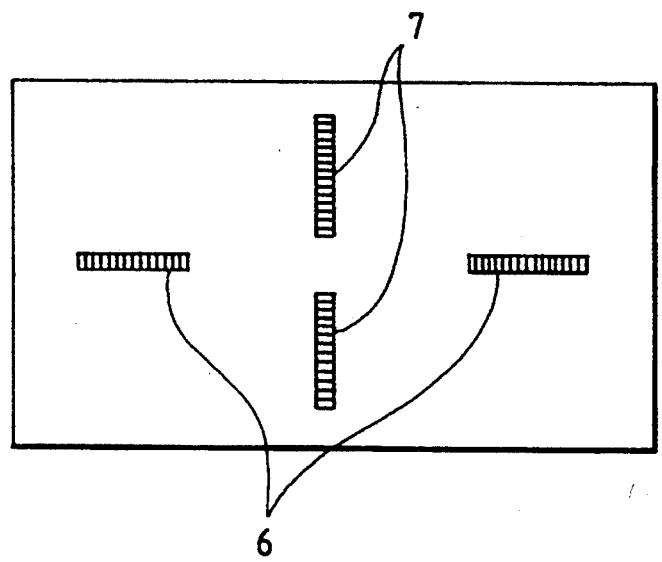
Figure 8:
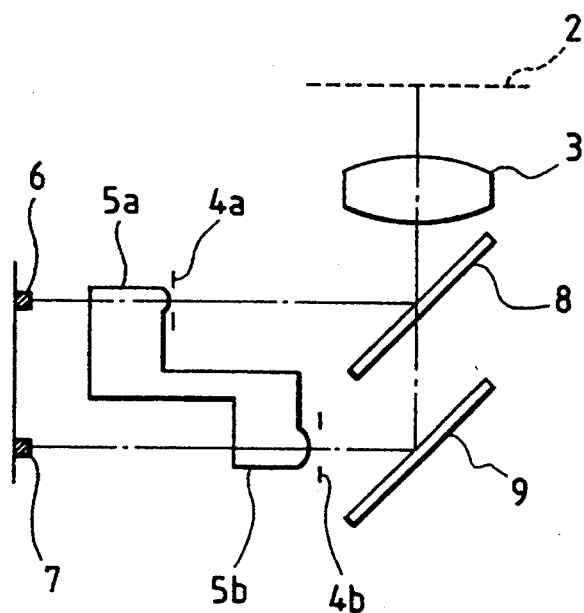
FIG. 8 is a view showing the arrangement of a binary focus detecting system in another focus detecting device of the prior art.
Figure 9:
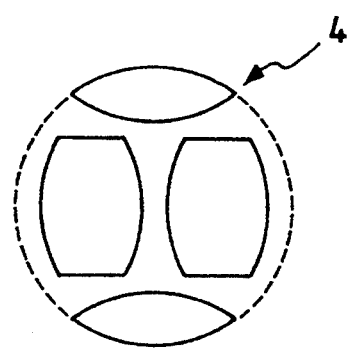
FIG. 9 is a view showing another example of the aperture stop of the prior art.
Figure 10A:
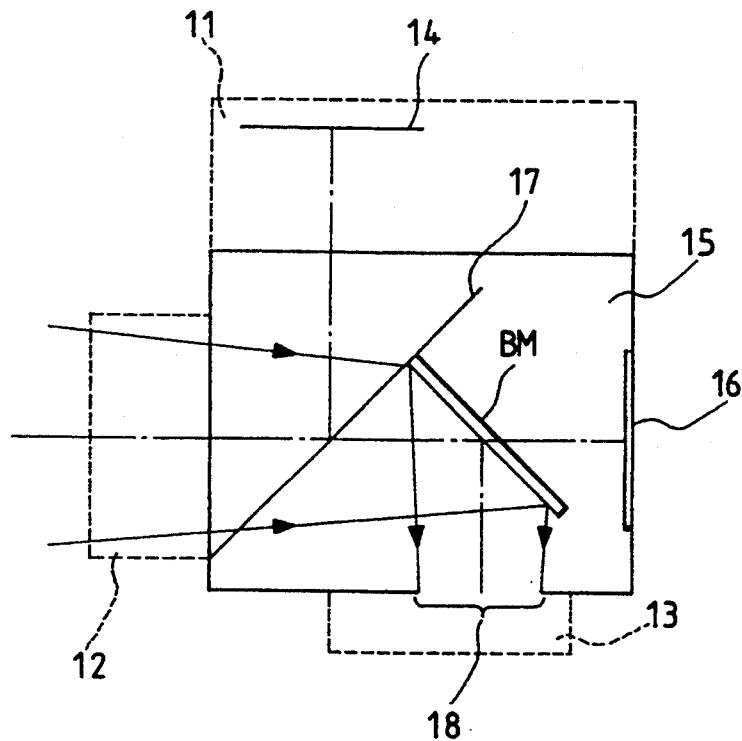
FIGS. 10A and 10B are views showing the states of field stops varying with the placement of an entrance pupil of the focus detecting system in the focus detecting device of the prior art.
Figure 10B:
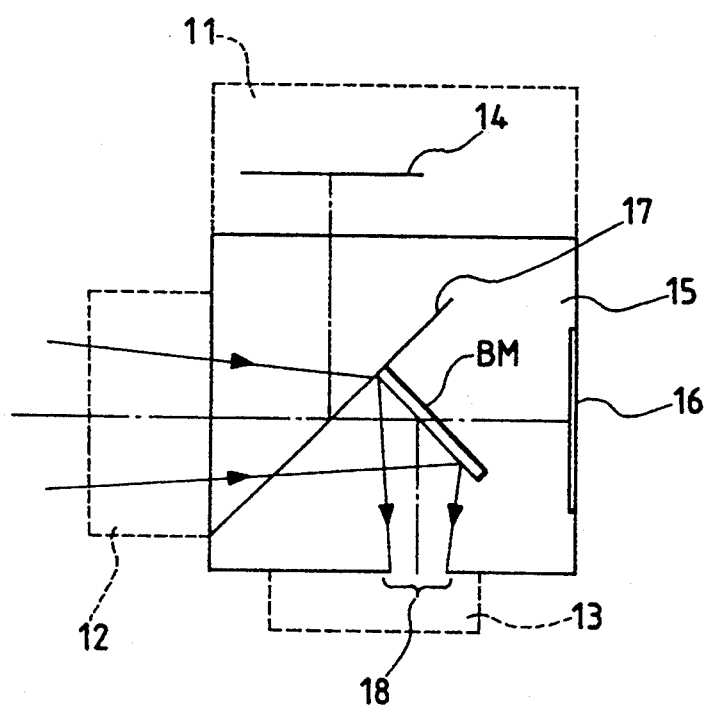

FIG. 12 shows focus detecting systems of the focus detecting device. FIG. 13 is a view showing the openings 25, 26, 27, and 28 and the vertices (indicated by marks x) of the reimaging lenses 29, 30, 31, and 32, viewed along the direction of the optical axis of the condenser lens 23. The barycenters (hereinafter abbreviated to centers) of the four openings 25, 26, 27, and 28 are arranged in a nearly straight line 37 (indicated by an alternate long and two short dashes line), and the vertices of the reimaging lenses 29, 30, 31, and 32 also substantially coincide with the straight line 37. In comparison with the configuration of the prior art shown in FIG. 5, the inner openings 26 and 27 are designed so that their areas are wide in particular. The use of the output signals from the light receiving element arrays 34 and 35 allows the focus detection in which the focusing accuracy is somewhat low, but the detectable defocus area at the imaging plane is broad. On the other hand, the use of those from the light receiving element arrays 33 and 36 enables the focus detection in which although the detectable defocus area at the imaging plane is narrower, the focusing accuracy is higher. Further, even with the use of the output signals from the light receiving element arrays 33 and 35, or 34 and 36, the focus detection can be carried out. In this way, the distance between the light receiving element arrays for two images formed by the outer beams is greater than that by the inner beams, so that as shown in FIG. 12, it is possible to provide the light receiving element arrays in a nearly straight line. The combination of the light receiving element arrays 33 and 35 is identical in focusing accuracy for focus detection with that of the light receiving element arrays 34 and 36.

Figure 14:
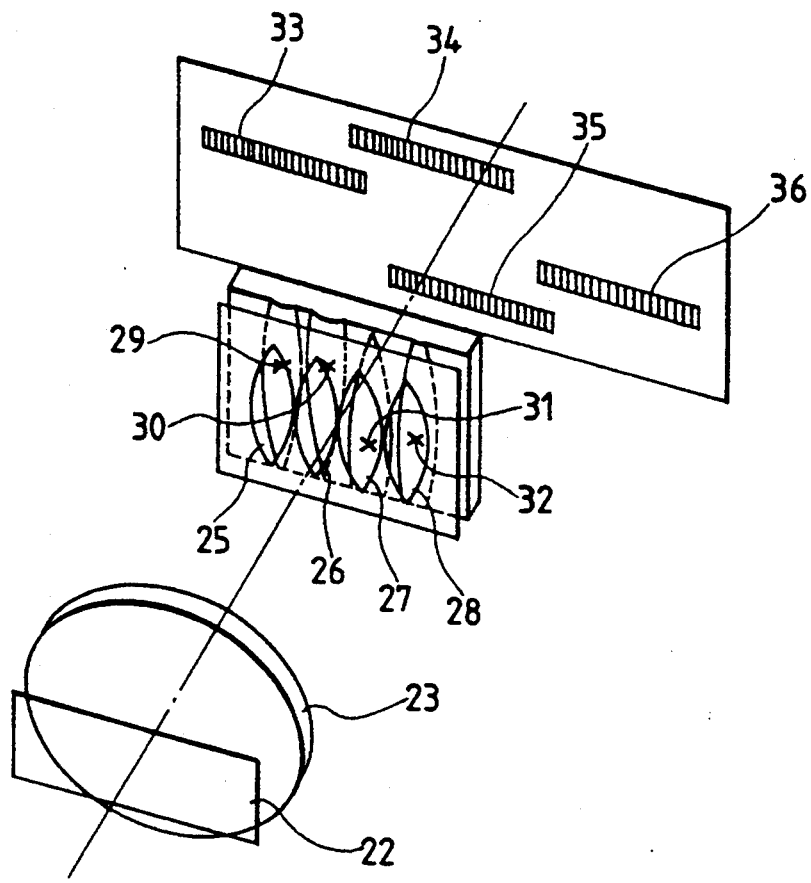
FIG. 14 is a view showing the arrangement of focus detecting systems in a second embodiment of the focus detecting device according to the present invention.

FIG. 14 shows the focus detecting systems in the second embodiment of the focus detecting device according to the present invention. The reference numerals are the same as those of the first embodiment. The focus detecting systems comprise the condenser lens 23 disposed adjacent to the preset imaging plane 22 of the photographic lens (not shown); the mirror (not shown) disposed behind the condenser lens 23; the four openings 25, 26, 27, and 28 arranged behind the mirror and constituting the aperture stop so that their centers are in a nearly straight line; the four reimaging lenses 29, 30, 31, and 32 corresponding to the four openings 25, 26, 27, and 28; and the light receiving element arrays 33, 34, 35, and 36 which constitute a photoelectric converting means, arranged in the vicinity of the imaging positions of light beams emerging from the reimaging lenses 29, 30, 31, and 32.

Figure 15:
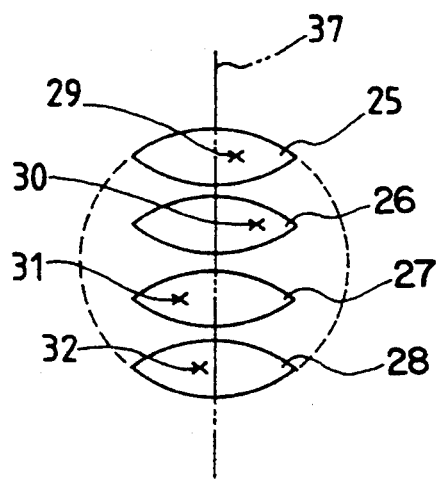
FIG. 15 is a view showing the configuration of openings and reimaging lenses of the focus detecting systems in FIG. 14.

FIG. 15 is a view showing the openings 25, 26, 27, and 28 and the vertices (indicated by marks x) of the reimaging lenses 29, 30, 31, and 32, viewed along the direction of the optical axis of the condenser lens 23. When the centers of the four openings 25, 26, 27, and 28 are connected with the straight line 37 (indicated by an alternate long and two short dashes line), the reimaging lenses 29, 30, 31, and 32 are situated so that their vertices are shifted from the straight line 37. In this way, the arrangement of the light receiving element arrays shown in FIG. 14 becomes possible, and each light receiving element array can be elongated compared with the first embodiment. This leads to the increases of the focus detecting field and the amount of defocus detection. In comparison with the inner beams, the outer beams are essentially large in angles of incidence and emergence relative to the condenser lens and the reimaging lenses, and are liable to disturbance. As shown in FIG. 15, therefore, it is desirable that the amount of shift of the vertices of the reimaging lenses 30 and 31 corresponding to the inner beams from the straight line 37 is made larger than that of the vertices of the reimaging lenses 9 and 32 corresponding to the outer beams.

Figure 16:
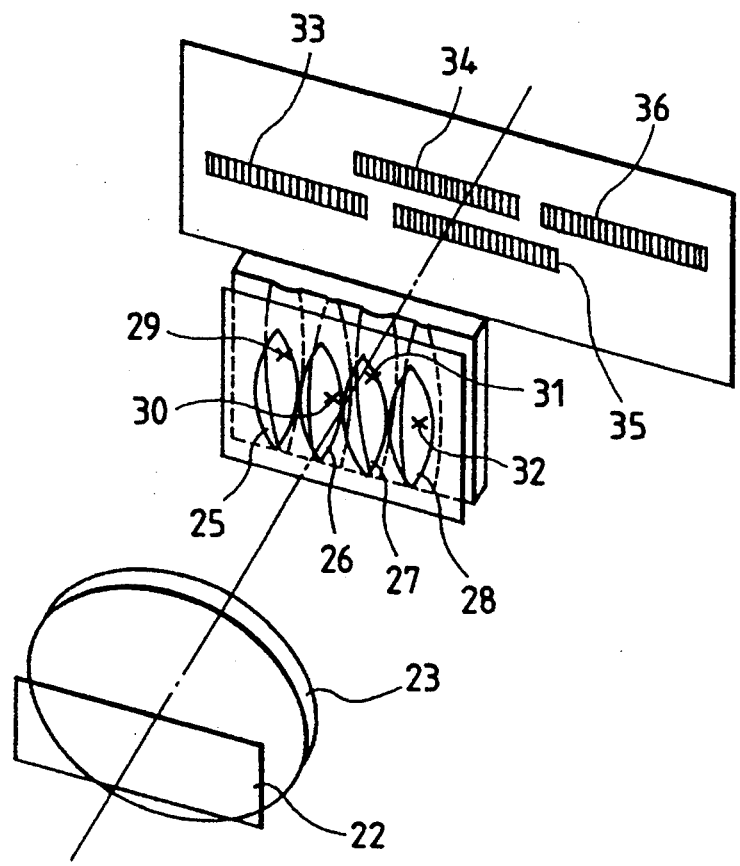
FIG. 16 is a view showing the arrangement of focus detecting systems In a third embodiment of the focus detecting device according to the present invention.

FIG. 16 shows the focus detecting systems in the third embodiment of the focus detecting device according to the present invention. The reference numerals are the same as those of the first embodiment. The focus detecting systems comprise the condenser lens 23 disposed adjacent to the preset imaging plane 22 of the photographic lens (not shown); the mirror (not shown) disposed behind the condenser lens 23; the four openings 25, 26, 27, and 28 arranged behind the mirror and constituting the aperture stop so that their centers are In a nearly straight line; the four reimaging lenses 29, 30, 31, and 32 corresponding to the four openings 25, 26, 27, and 28; and the light receiving element arrays 33, 34, 35, and 36 which constitute a photoelectric converting means, arranged in the vicinity of the imaging positions of light beams emerging from the reimaging lenses 29, 30, 31, and 32.

Figure 17:
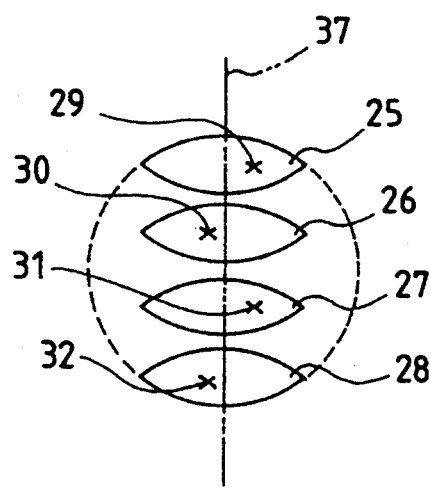
FIG. 17 is a view showing the configuration of openings and reimaging lenses of the focus detecting systems in FIG. 16.

FIG. 17 is a view showing the openings 25, 26, 27, and 28 and the vertices (indicated by marks x) of the reimaging lenses 29, 30, 31, and 32, viewed along the direction of the optical axis of the condenser lens 23. When the centers of the four openings 25, 26, 27, and 28 are connected with the straight line 37 (indicated by an alternate long and two short dashes line), the reimaging lenses 29 and 31, as well as the reimaging lenses 30 and 32, are situated so that their vertices are shifted from the straight line 37 in the same direction and by the same amount. In this way, the arrangement of the light receiving element arrays shown in FIG. 16 becomes possible. Thus, in comparison with the second embodiment, it is possible to make the light receiving element arrays compact and diminish the amounts of decentering of the reimaging lenses corresponding to the inner beams so that the disturbance of the light beams is hard to occur.

Figure 18:
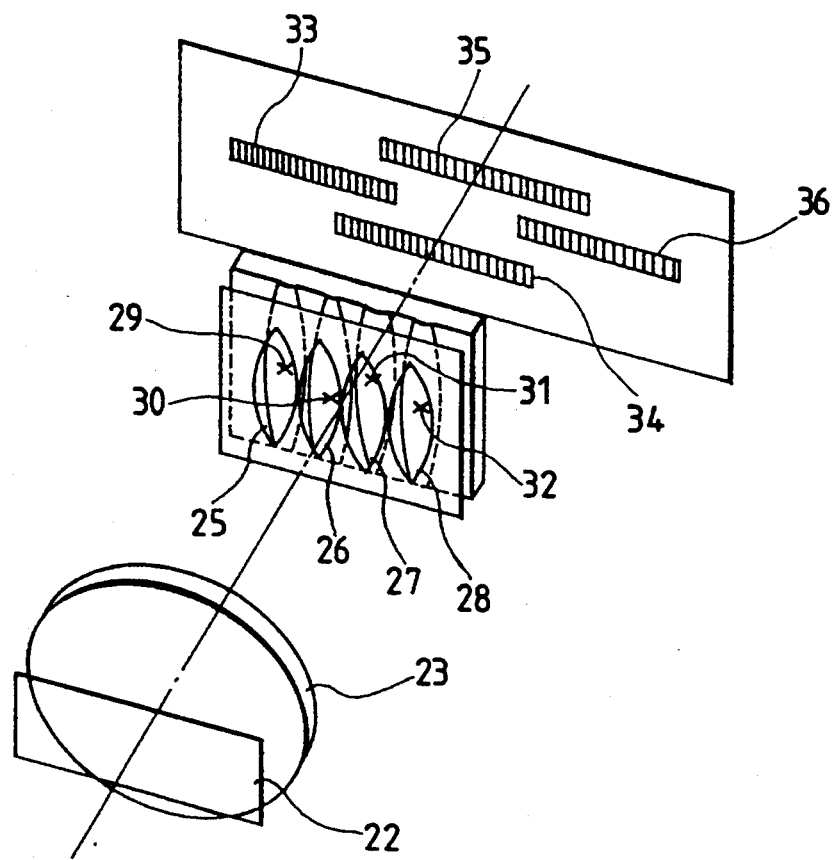
FIG. 18 is a view showing the arrangement of focus detecting systems in a fourth embodiment of the focus detecting device according to the present invention.

FIG. 18 shows the focus detecting systems in the fourth embodiment of the focus detecting device according to the present invention. The reference numerals are the same as those of the first embodiment. The focus detecting systems comprise the condenser lens 23 disposed adjacent to the preset imaging plane 22 of the photographic lens (not shown); the mirror (not shown) disposed behind the condenser lens 23; the four openings 25, 26, 27, and 28 arranged behind the mirror and constituting the aperture stop so that their centers are in a nearly straight line; the four reimaging lenses 29, 30, 31, and 32 corresponding to the four openings 25, 26, 27, and 28; and the light receiving element arrays 33, 34, 35, and 36 which constitute a photoelectric converting means, arranged in the vicinity of the imaging positions of light beams emerging from the reimaging lenses 29, 30, 31, and 32.

Figure 19:
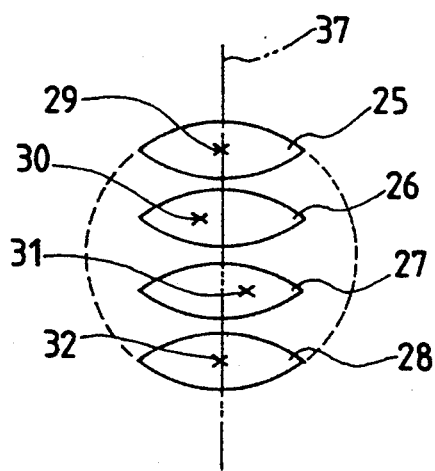
FIG. 19 is a view showing the configuration of openings and reimaging lenses of the focus detecting systems In FIG. 18.

FIG. 19 is a view showing the openings 25, 26, 27, and 28 and the vertices (indicated by marks x) of the reimaging lenses 29, 30, 31, and 32, viewed along the direction of the optical axis of the condenser lens 23. When the centers of the four openings 25, 26, 27, and 28 are connected with the straight line 37 (indicated by an alternate long and two short dashes line), the reimaging lenses 30 and 31 are situated so that their vertices are shifted from the straight line 37 in opposite directions and by substantially the same amount, while the reimaging lenses 29 and 32 are such that their vertices practically overlap the straight line 37. In this way, the arrangement of the light receiving element arrays shown in FIG. 18 becomes possible. Thus, in comparison with the second embodiment, it is possible to make the light receiving element arrays compact and diminish the amounts of decentering of the reimaging lenses corresponding to the inner and outer beams so that the disturbance of the light beams is hard to occur.

Figure 20:
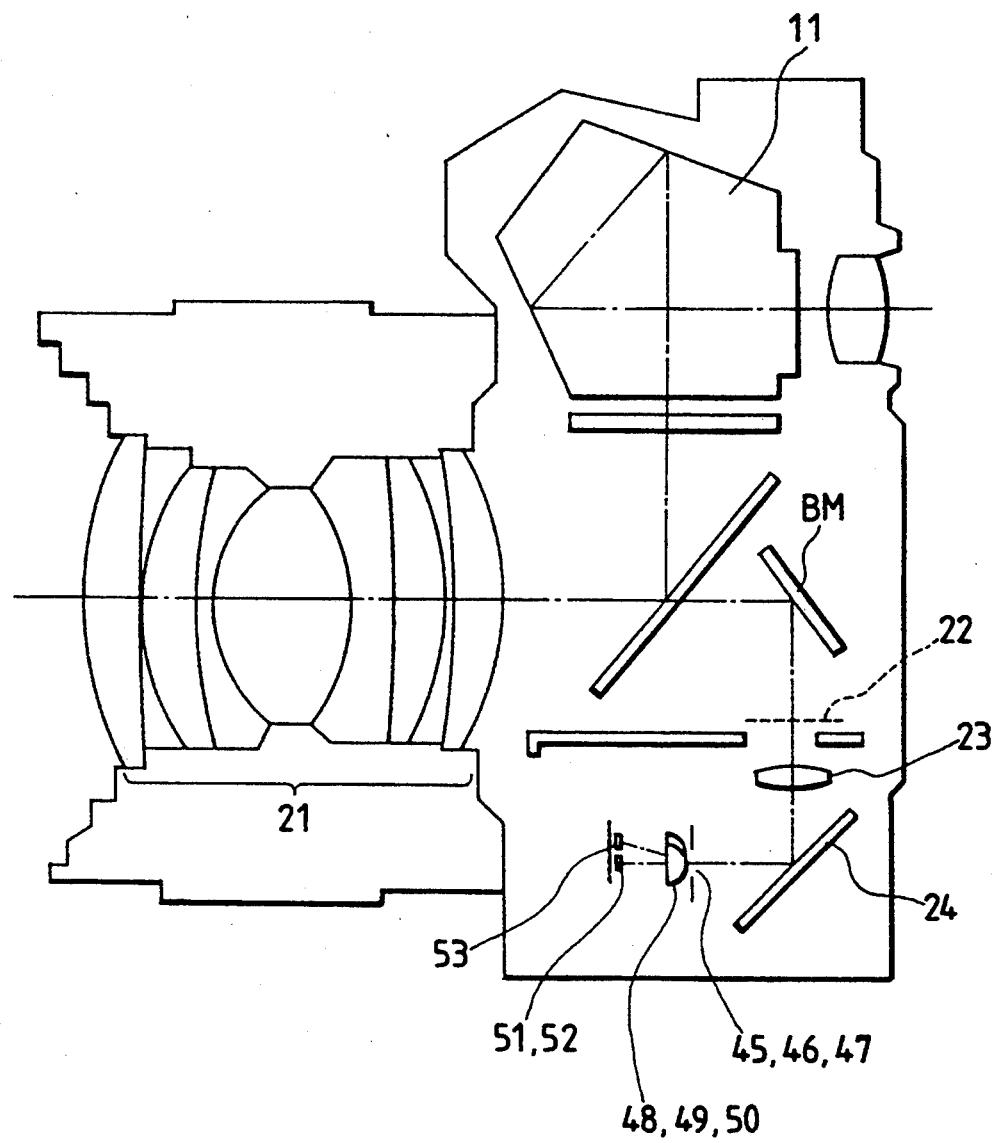
FIG. 20 is a view showing a state where a fifth embodiment of the focus detecting device according to the present Invention is disposed In a camera.
Figure 21:
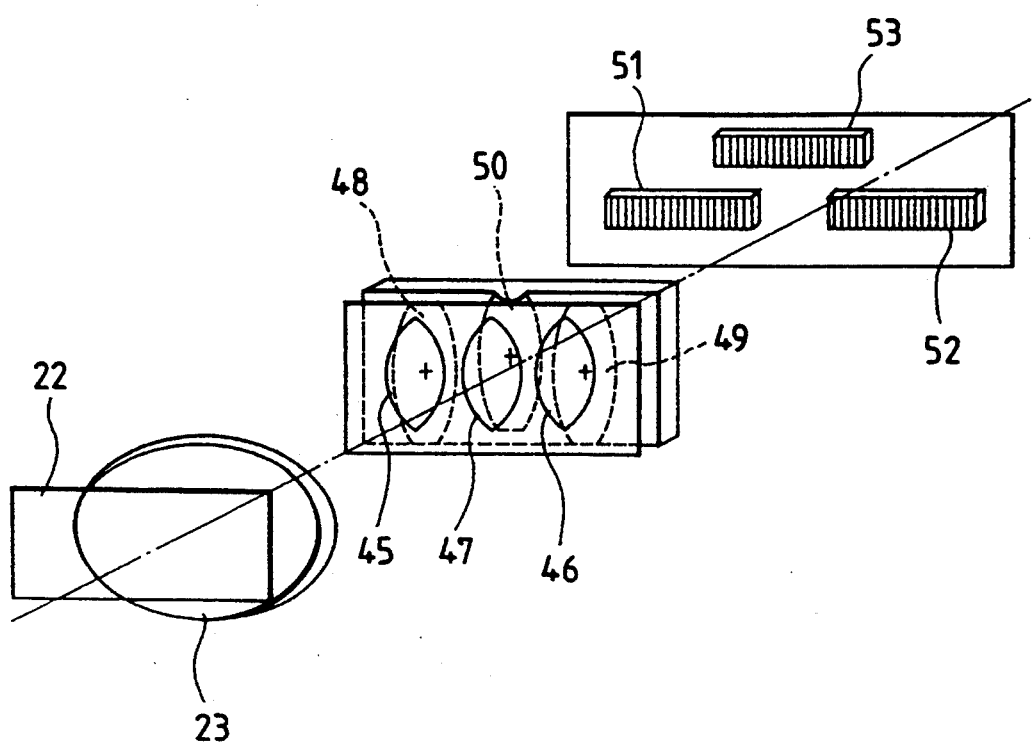
FIG. 21 is a view showing the arrangement of focus detecting systems In the fifth embodiment.

In accordance with FIGS. 20 to 23A and 23B, reference is made to the fifth embodiment of the focus detecting device according the present invention. In FIGS. 20 and 21, this device includes the condenser lens 23 disposed adjacent to the preset imaging plane 22 of the photographic lens 21; the mirror 24 (not shown in FIG. 21) disposed behind the condenser lens 23; three openings 45, 46, and 47 (arranged perpendicular to the plane of the figure in FIG. 20) situated behind the mirror 24; three reimaging lenses 48, 49, and 50 corresponding to individual openings; and light receiving element arrays 51, 52, and 53 provided adjacent to the imaging positions of light beams emerging from the reimaging lenses 48, 49, and 50. In FIG. 20, the light receiving element arrays are provided normal to the plane of the figure. In the fifth embodiment, one reimaging system composed of the preset imaging plane 22, the opening 45, the reimaging lens 48, and the light receiving element array 51 is represented by A; another reimaging system composed of the preset imaging plane 22, the opening 46, the reimaging lens 49, and the light receiving element array 52 by B; and the other reimaging system composed of the preset imaging plane 22, the opening 47, the reimaging lens 50, and the light receiving element array 53 by C.

Figure 22:
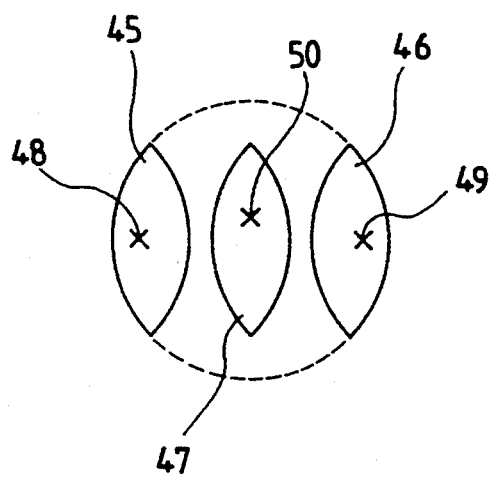
FIG. 22 is a view showing the configuration of openings and reimaging lenses of the focus detecting systems in the fifth embodiment.

FIG. 22 depicts the configuration of the openings 45, 46, and 47 and the vertices of the reimaging lenses 48, 49, and 50, viewed along the direction of the optical axis of the condenser lens. Since the positions of the centers of the openings in respective focus detecting systems lie in a straight line, it is possible to accommodate each reimaging system with one light receiving element array, irrespective of the combination of the reimaging systems for focus detection (where the positions of the centers of the openings in respective reimaging systems are out of line, this requires the light receiving element arrays in which the directions of the arrays of light receiving elements vary with the combination of the reimaging systems for focus detection). Further, an arrangement is made such that the reimaging lens 50 of the reimaging system C is decentered perpendicular to the direction in which the centers of the openings in respective reimaging systems are lined, and the light receiving element arrays 51, 52, and 53 are out of line. These effects make it possible to construct the light receiving element arrays 51, 52, and 53 with sufficient lengths.

Figure 23A:
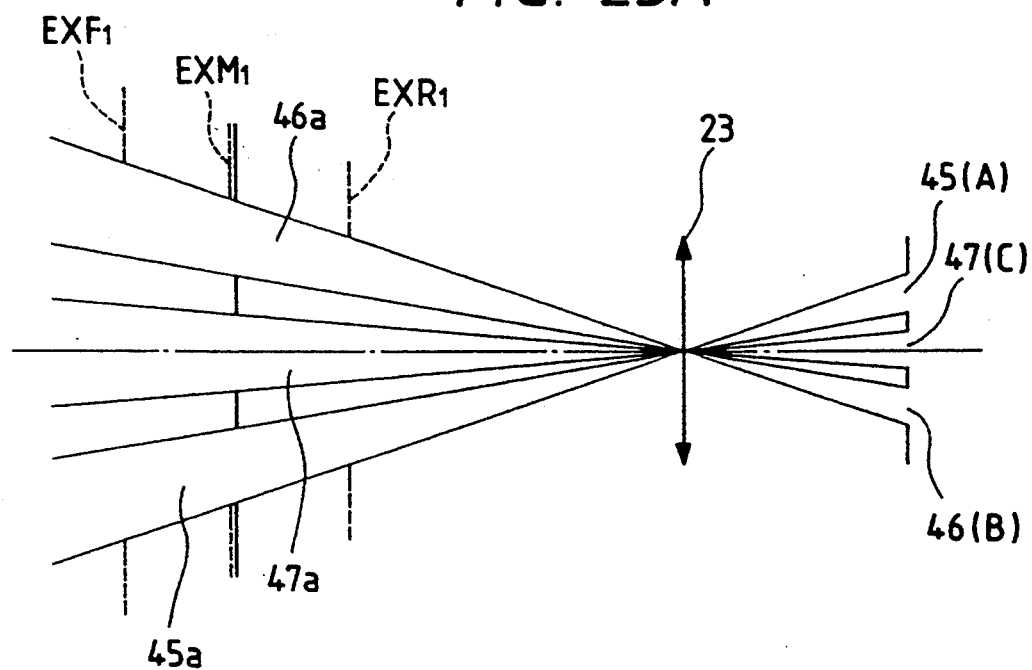
FIGS. 23A and 23B are views showing the states of transmission of pupils of a photographic lens and the focus detecting systems in the fifth embodiment.
Figure 23B:
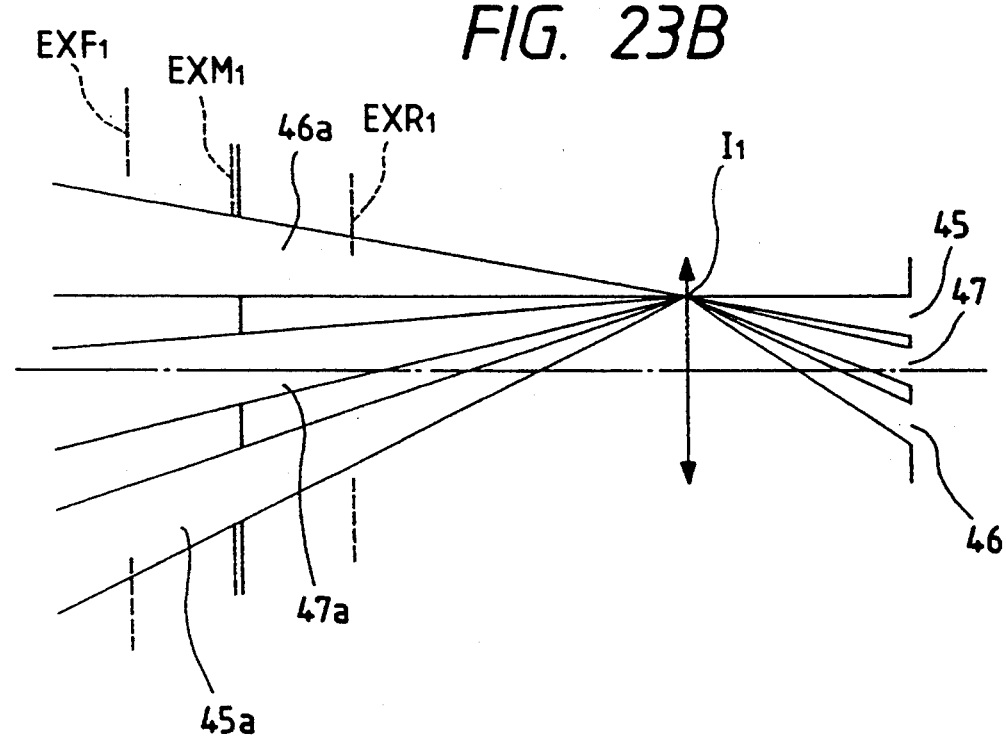

FIGS. 23A and 23B show the states of pupil transmission of the photographic lens and the focus detecting systems. In these figures, reference numerals 45a, 46a, and 47a denote the entrance pupils of the reimaging systems A, B, and C, respectively, and symbol $EXM_1$ designates one example of the position of the exit pupil of the photographic lens, which coincides with that of the entrance pupil of the focus detecting systems. Symbol $EXF_1$ represents another example of the position of the exit pupil of the photographic lens, which is closer to the object than the position of the entrance pupil of the focus detecting systems. Symbol $EXR_1$ represent still another example of the position of the exit pupil of the photographic lens, which is closer to the preset imaging plane than the position of the entrance pupil of the focus detecting systems. The exit pupils $EXM_1$, $EXF_1$, and $EXR_1$ have the same F number.

FIG. 23A depicts an image of the object formed on the optical axis of the photographic lens. The light beams traversing any position of the exit pupils $EXM_1$, $EXF_1$, and $EXR_1$ are relayed to the reimaging systems A, B, and C. FIG. 23B depicts the object image formed at a position $I_1$ distant from the optical axis of the photographic lens. Where the position of the exit pupil of the photographic lens is $EXM_1$, the light beams are relayed to the reimaging systems A, B, and C. Where it is $EXF_1$, the light beams are relayed to the reimaging systems B and C, but not relayed completely to the reimaging system A. where it is $EXR_1$, the light beams are relayed to the reimaging systems A and C, but not relayed completely to the reimaging system B. Specifically, for the position of the exit pupil $EXF_1$, focus detection is performed by the output signals from the reimaging systems A and B, and thereby high-accuracy focusing can be obtained. For the exit pupil $EXF_1$, focus detection is performed by the output signals from the reimaging systems B and C, and thereby focusing can be surely carried out. As for the $EXR_1$, focus detection is performed by the output signals from the reimaging systems A and C, and thereby focusing can be surely obtained. The light beams passing through the preset imaging plane are introduced, through the condenser lens, the openings, and the reimaging lenses, into the light receiving element arrays. In this case, the reimaging optical system (the reimaging system C compared with the reimaging systems A and B) having the entrance pupil provided at a different position from the optical axis of the condenser lens projects the object image of different size because the light beam is incident at different position and angle on the lens element and undergoes different refraction. Since the pitch of elements of each light receiving element array varies with the size of the object image to be projected, the output signal such that the object image of identical size is projected can be obtained. The dimension of the elements in a direction perpendicular to the light receiving element array may well be set in the same manner. Thus, by changing the combinations of the reimaging systems in accordance with the positions of the exit pupil and the object image to be focused, focusing becomes possible, with a high degree of accuracy, under a wide condition as a system. The following tables show the examples of numerical data of the fifth embodiment.

Table 1 gives the radii of curvature, lens spaces, and refractive indices of the reimaging systems A, B, and C.

TABLE 1

| Surface No. | Radius of curvature | Space | Refractive index |
| --- | --- | --- | --- |
| 1 | Equivalent imaging plane | 4.5 | 1.00000 |
| 2 | ∞ | 0.5 | 1.51805 |
| 3 | ∞ | 0.2 | 1.00000 |
| 4 | 8.3 | 3.0 | 1.52742 |
| 5 | −124.3 | 14.2 | 1.00000 |
| 6 | Stop | 0.1 | 1.00000 |
| 7 | 3.0 | 2.0 | 1.52742 |
| 8 | ∞ | 6.2 | 1.00000 |
| 9 | ∞ | 0.5 | 1.52742 |
| 10 | Light receiving surface | | 1.00000 |

Table 2 gives the positions of the optical axes of the reimaging lenses at a plane normal to the optical axis of the condenser lens including the position of the stop.

TABLE 2

| Reimaging system A | y = 1.77 | z = 0.00 |
| --- | --- | --- |
| Reimaging system B | y = −1.77 | z = 0.00 |
| Reimaging system C | y = 0.00 | z = 0.36 |

In Table 2, symbol y represents the directions of the light receiving element arrays.

Table 3 shows the numerical values representative of the shape of the stop where the opening is taken as the overlapping portion of a circle of a radius of curvature RL, with y=YL and z=ZL as its center, and another circle of a radius of curvature RU, with y=YU and z=ZU.

TABLE 3

|  | YL | ZL | RL | YU | ZU | RU |
|---|---|---|---|---|---|---|
| Reimaging system A | 0.00 | 0.00 | 1.68 | 2.58 | 0.00 | 1.68 |
| Reimaging system B | −2.58 | 0.00 | 1.68 | 0.00 | 0.00 | 1.68 |
| Reimaging system C | −1.29 | 0.00 | 1.68 | 1.29 | 0.00 | 1.68 |

When the sensor pitch of the reimaging system A is taken as P, the sensor pitches of respective imaging systems are given in Table 4.

TABLE 4

| Reimaging system A | 1.000 × P |
|---|---|
| Reimaging system B | 0.977 × P |
| Reimaging system C | 1.000 × P |

The sensor pitches of the reimaging systems A, B, and C may be made identical so that their output values are processed to have the same effect.

Next, reference is made to the sixth embodiment of the focus detecting device according to the present invention. This embodiment uses the same focus detecting optical system as in the fifth embodiment, except that the reimaging systems A, B, and C are different from those shown in FIGS. 20 and 21. When the sensor pitch of the reimaging system A is denoted by P, the sensor pitches of the reimaging systems A, B, and C are made identical as shown in Table 5.

TABLE 5

| Reimaging system A | 1.000 × P |
|---|---|
| Reimaging system B | 1.000 × P |
| Reimaging system C | 1.000 × P |

Now, the output characteristics form the reimaging system A, B, and C are taken as $S_A(x)$, $S_B(x)$, and $S_C(x)$, respectively. Here, x is the position coordinate in the direction in which the elements on the sensor are arranged. When the light beam traversing the intersection of the preset imaging plane 22 with the optical axis of the condenser lens 23 is incident on the sensor, the position of its center is defined as x=0. Also, it is desirable that the output characteristics $S_A(x)$, $S_B(x)$, and $S_C(x)$ are converted to have continuous characteristics, for example, by a spline interpolation, from the output values from individual sensor elements.

Figure 24:
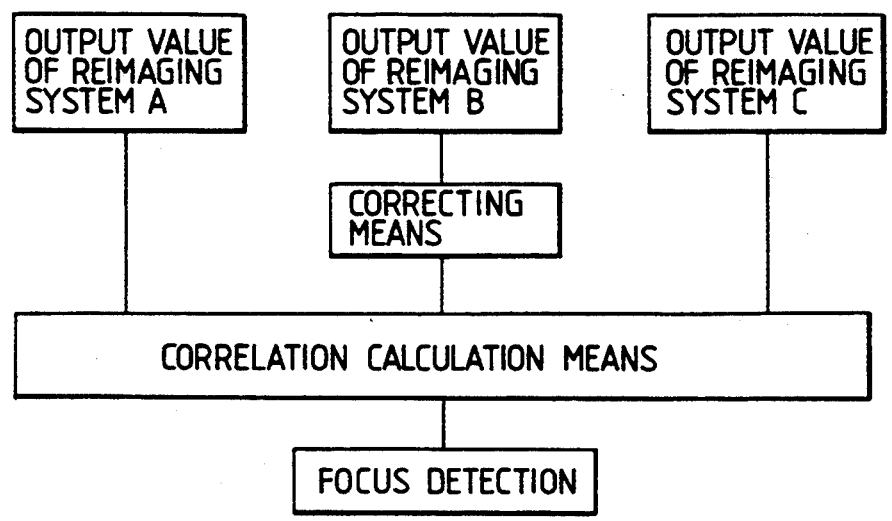
FIG. 24 is a block diagram for explaining a sixth embodiment of the present invention.
Figure 25A:
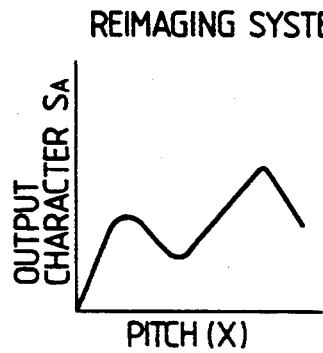
FIGS. 25A, 25B, 25C and 25D are graphs showing a change of the output characteristics of the reimaging systems in the sixth embodiment.
Figure 25B:
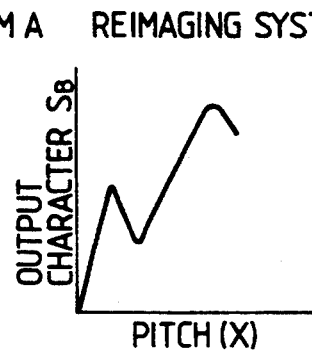
Figure 25C:
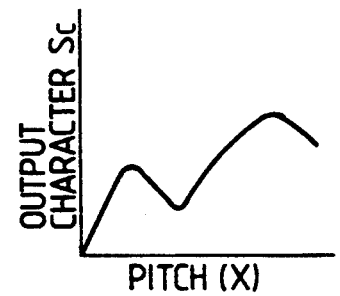
Figure 25D:
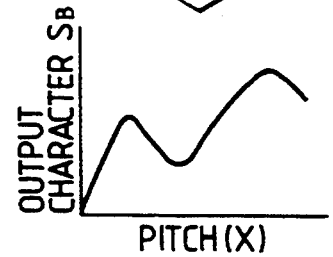

In the sixth embodiment, as shown in FIG. 24, focus detection is performed by the correlation calculation of the output values from the sensors corresponding to the reimaging systems A, B, and C. Here, in other embodiments, the reimaging systems having the entrance pupils disposed at different distances from the optical axis of the condenser lens project the object images of various sizes on the light receiving element arrays, because the light beams are incident at different positions and angles on the lens elements and undergo different refractions. Consequently, provision is made to adjust the thicknesses of lenses of the reimaging systems or of cover resin of the light receiving element arrays.

In the sixth embodiment, however, as given in Table 5, the reimaging systems A, B, and C are equal in sensor pitch to one another and, as shown in FIG. 24, the output value of the reimaging system B at a different distance from the optical axis of the condenser lens is adjusted by correcting means. Thus, the output values (converted Into the continuous data by the spline interpolation) of the reimaging systems A, B, and C, as shown in FIGS. 25A, 25B, 25C and 25D are such that only the output value of the reimaging system B is different. This is because the reimaging system B projects the object image of different size on the light receiving element array.

The sixth embodiment is constructed so that the output characteristic $S_B$ is extended and the pitch x is reduced. Hence, as given In Table 6, the data are corrected by the correcting means in FIG. 24 for the correlation calculation, and focus detection is performed.

TABLE 6

| Data of reimaging system A | $S_A(x)$ |
|---|---|
| Data of reimaging system B | $S_B \times 0.977$ (x × 1.024) |
| Data of reimaging system C | $S_C(x)$ |

In the sixth embodiment, the data of the reimaging system B involve the correction by which the output characteristic $S_B$ is 0.977 times less than the other characteristics and the pitch x is 1.024 times greater than the other pitches. The correlation calculation is made in terms of the reimaging systems A, B, and C, using the data shown in Table 6. In view of the aberration and the non-uniformity of the amount of light in the photographic lens and the focus detecting system, this embodiment may be applied.

Further, as shown in FIG. 14, the reimaging systems may well be increased to four or more so that the centers of the entrance pupils of respective reimaging systems are arranged in a line and the sensor pitches vary with the positional relationships between each entrance pupil and the condenser lens, and between the optical axes of each reimaging lens and the condenser lens.

Figures 26A, 26B, 26C:
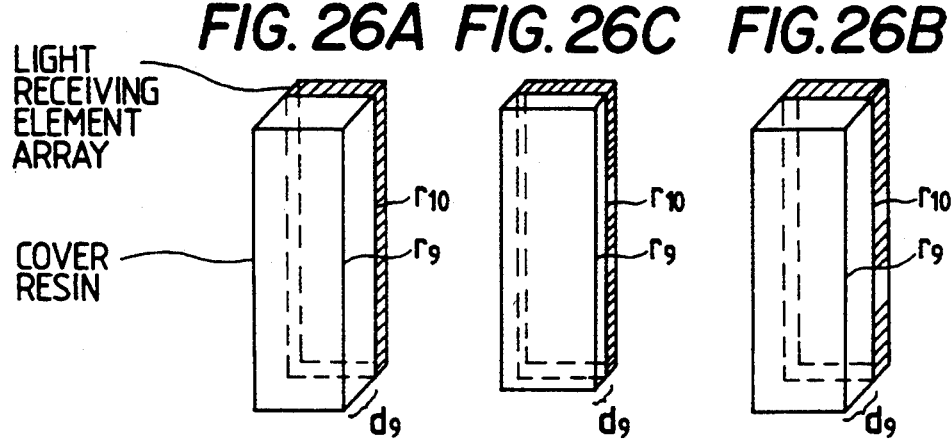
FIGS. 26A, 26B, 26C and 26D are views for explaining a seventh embodiment of the present invention.
Figure 26D:
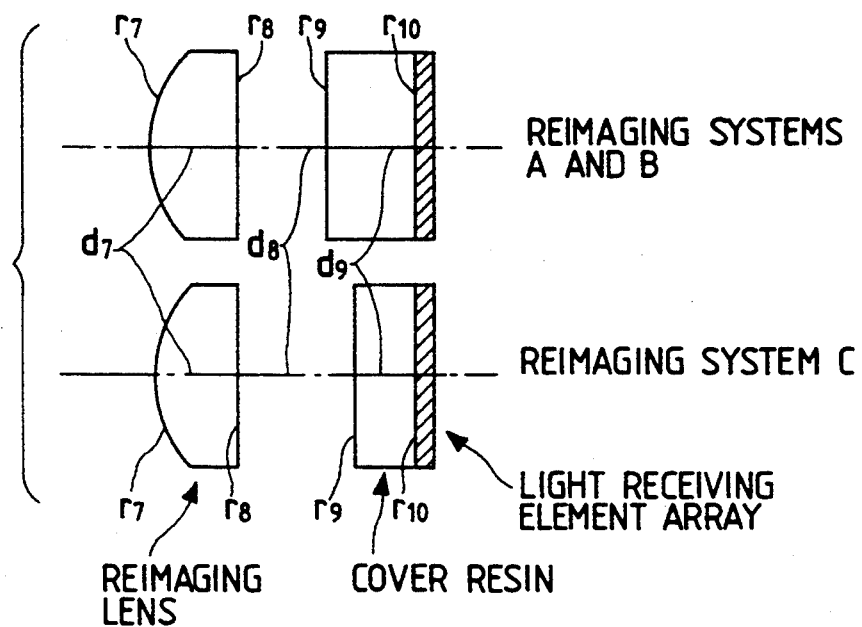

Referring to FIGS. 26A, 26B, 26C and 26D, the seventh embodiment of the focus detecting device according to the present invention is explained. The fundamental arrangement of the seventh embodiment is identical with that of the fifth embodiment, except that as shown in FIG. 26D, the reimaging systems A and B are different from the reimaging system C in thickness of cover resin of the light receiving element array. In these figures, $r_7, r_8, \ldots$ represent radii of curvature of individual surfaces, and $d_7, d_8 \ldots$ represent thicknesses of individual lenses (and covers) or spaces therebetween. The following tables show the examples of numerical data of the seventh embodiment.

Table 7 gives the radii of curvature, lens spaces, and refractive indices of the reimaging systems A, B, and C. From the numerical values in the seventh to ninth rows indicated in this table, the above difference between the thicknesses will be seen.

TABLE 7

| Surface No. | Radius of curvature | Space Reimaging system A | Space Reimaging system B | Space Reimaging system C | Refractive index |
|---|---|---|---|---|---|
| 1 | Equivalent imaging plane | 4.5 | 4.5 | 4.5 | 1.00000 |
| 2 | ∞ | 0.5 | 0.5 | 0.5 | 1.51805 |

TABLE 7-continued

| Surface No. | Radius of curvature | Space Reimaging system A | Space Reimaging system B | Space Reimaging system C | Refractive index |
|---|---|---|---|---|---|
| 3 | ∞ | 0.2 | 0.2 | 0.2 | 1.00000 |
| 4 | 8.3 | 3.0 | 3.0 | 3.0 | 1.52742 |
| 5 | −124.3 | 14.2 | 14.2 | 14.2 | 1.00000 |
| 6 | Stop | 0.1 | 0.1 | 0.1 | 1.00000 |
| 7 | 3.0 (r7) | 2.0 (d7) | 2.0 | 2.0 (d7) | 1.52742 |
| 8 | ∞ (r8) | 5.71(d8) | 5.71 | 6.2 (d8) | 1.00000 |
| 9 | ∞ (r9) | 0.99(d9) | 0.99 | 0.5 (d9) | 1.52742 |
| 10 | Light receiving surface (r10) | | | | 1.00000 |

Table 8 gives the positions of the optical axes of the reimaging lenses at a plane normal to the optical axis of the condenser lens including the position of the stop.

TABLE 8

| Reimaging system A | y = 1.77 | z = 0.00 |
|---|---|---|
| Reimaging system B | y = −1.77 | z = 0.00 |
| Reimaging system C | y = 0.00 | z = 0.36 |

In Table 8, symbol y represents the directions of the light receiving element arrays.

Table 9 shows the numerical values representative of the shape of the stop where the opening is taken as the overlapping portion of a circle of a radius of curvature RL, with y=YL and z=ZL as its center, and another circle of a radius of curvature RU, with y=YU and z=ZU.

TABLE 9

| | YL | ZL | RL | YU | ZU | RU |
|---|---|---|---|---|---|---|
| Reimaging system A | 0.00 | 0.00 | 1.68 | 2.58 | 0.00 | 1.68 |
| Reimaging system B | −2.58 | 0.00 | 1.68 | 0.00 | 0.00 | 1.68 |
| Reimaging system C | −1.29 | 0.00 | 1.68 | 1.29 | 0.00 | 1.68 |

The reimaging systems may well be increased to four or more so that the centers of the entrance pupils of respective reimaging systems are arranged in a line and the thicknesses of cover resin or cover glass of the sensors vary with the positional relationships between each entrance pupil and the condenser lens, and between the optical axes of each reimaging lens and the condenser lens.

Figure 27:
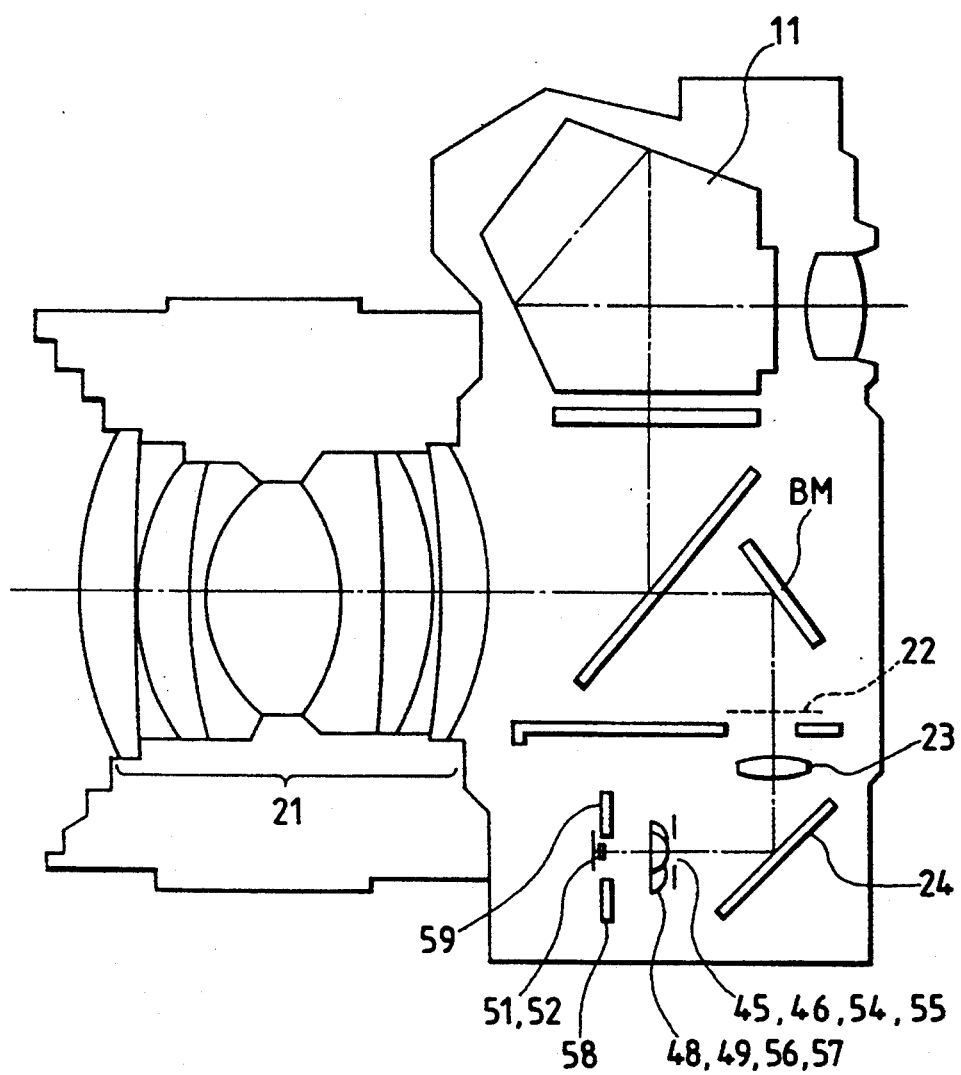
FIG. 27 is a view showing a state where an eighth embodiment of the present invention is disposed in a camera.
Figure 28:
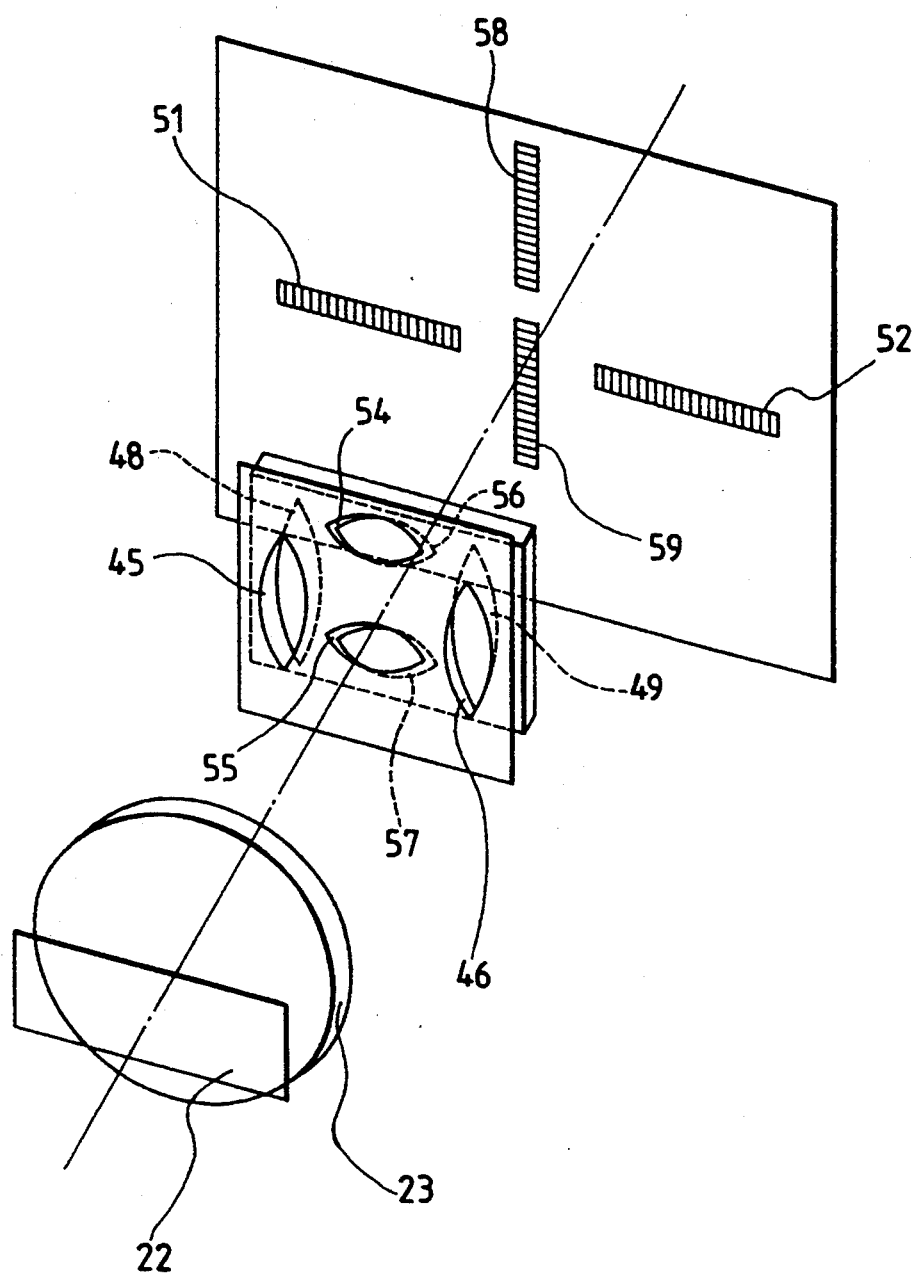
FIG. 28 is a perspective view showing focus detecting systems in the eighth embodiment.

FIGS. 27 and 28 show the eighth embodiment of the focus detecting device according to present invention. This device includes the condenser lens 23 disposed adjacent to the preset imaging plane 22 of the photographic lens 21 (not shown in FIG. 28); the mirror 24 (not shown in FIG. 28) disposed behind the condenser lens 23; two openings 45 and 46 (arranged perpendicular to the plane of the figure In FIG. 27) situated behind the mirror 24; remaining two openings 54 and 55 arranged to be asymmetrical with respect to the optical axis of the condenser lens in the plane of tile figure; four reimaging lenses 48, 49, 56, and 57 corresponding to individual openings; and light receiving element arrays 51, 52, 58, and 59 provided adjacent to the imaging positions of light beams emerging from the reimaging lenses 48, 49, 56, and 57. In FIG. 27, the light receiving element arrays 51 and 52 are provided normal to the plane of the figure, while the light receiving element arrays 58 and 59 perpendicular to the optical axis of the condenser lens. In the eighth embodiment, one reimaging system composed of the preset imaging plane 22, the opening 45, the reimaging lens 48, and the light receiving element array 51 is represented by A; another reimaging system composed of the preset imaging plane 22, the opening 46, the reimaging lens 49, and the light receiving element array 52 by B; still another reimaging system composed of tile preset imaging plane 22, the opening 54, the reimaging lens 56, and the light receiving element array 58 by C; and the other reimaging system composed of the preset imaging plane 22, the opening 55, the reimaging lens 57, and the light receiving element array 59 by D. FIG. 28 depicts the configuration of the openings 45, 46, 54, and 55, viewed along the direction of the optical axis of the condenser lens. Here, the reimaging systems A and B have the same effect as in the conventional focus detecting optical systems.

Figure 29:
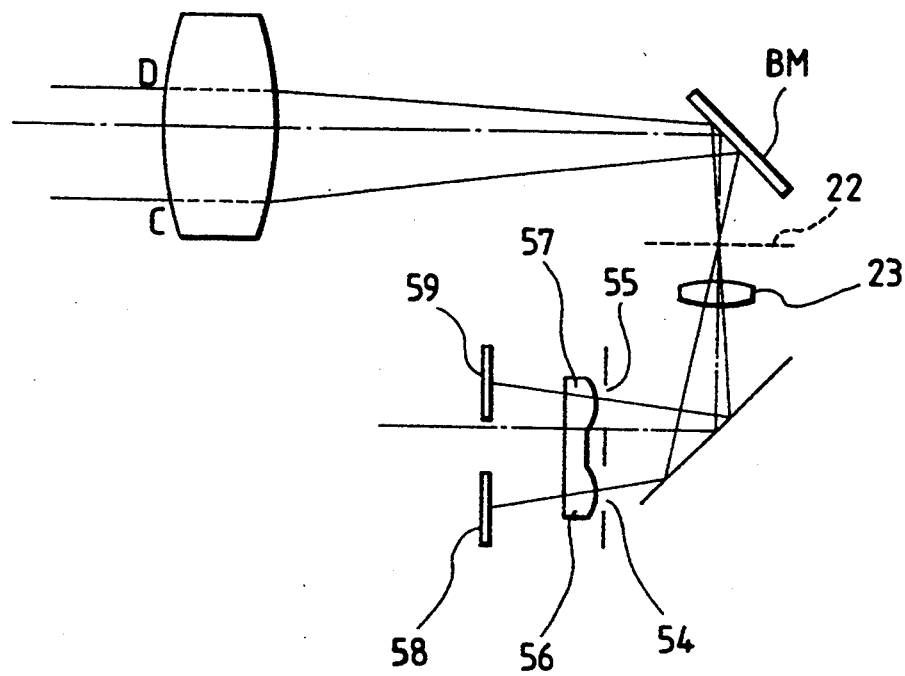
FIG. 29 is a view showing the state of two reimaging systems in the eighth embodiment.

When the finder section 11 of the camera body is provided in its upper part, an arrangement is made such that the light beam traversing the upper side of the optical axis of the photographic lens 21 to enter the reimaging system D passes closer to the optical axis of the photographic lens than that traversing the under side thereof to enter the reimaging system C. This arrangement makes the sub-mirror BM small. FIG. 29 shows only the reimaging systems C and D. In this figure, the light beams incident on the reimaging systems C and D undergo refractions which are different from each other through the condenser lens, and project the object images which are the same but different in size. Since the pitch of elements of each light receiving element array varies with the size of the projected object image, the output signal is obtained such that the object image of identical size is projected. It is also possible to set the dimension of the elements perpendicular to the light receiving element array in the same manner. The following tables show the examples of numerical data in the eighth embodiment.

Table 10 gives the radii of curvature, lens spaces, and refractive indices of the reimaging systems A, B, C, and D.

TABLE 10

| Surface No. | Radius of curvature | Space | Refractive index |
|---|---|---|---|
| 1 | Equivalent imaging plane | 4.5 | 1.00000 |
| 2 | ∞ | 0.5 | 1.51805 |
| 3 | ∞ | 0.2 | 1.00000 |
| 4 | 8.3 | 3.0 | 1.52742 |
| 5 | −124.3 | 14.2 | 1.00000 |
| 6 | Stop | 0.1 | 1.00000 |
| 7 | 3.0 | 2.0 | 1.52742 |
| 8 | ∞ | 6.2 | 1.00000 |
| 9 | ∞ | 0.5 | 1.52742 |
| 10 | Light receiving surface | | 1.00000 |

Table 11 gives the positions of the optical axes of the reimaging lenses at a plane normal to the optical axis of the condenser lens including the position of the stop.

TABLE 11

| Reimaging system A | y = 1.77 | z = 0.00 |
|---|---|---|
| Reimaging system B | y = −1.77 | z = 0.00 |

TABLE 11-continued

| | | | |
|---|---|---|---|
| Reimaging system C | y = 0.00 | z = 0.65 |
| Reimaging system D | y = 0.00 | z = −0.65 |

In Table 11, symbol y represents the directions of the light receiving element arrays.

Table 12 shows the numerical values representative of the shape of the stop where the opening is taken as the overlapping portion of a circle of a radius of curvature RL, with y=YL and z=ZL as its center, and another circle of a radius of curvature RU, with y=YU and z=ZU.

TABLE 12

| | YL | ZL | RL | YU | ZU | RU |
|---|---|---|---|---|---|---|
| Reimaging system A | 0.00 | 0.00 | 1.68 | 2.58 | 0.00 | 1.68 |
| Reimaging system B | −2.58 | 0.00 | 1.68 | 0.00 | 0.00 | 1.68 |
| Reimaging system C | 0.00 | 0.66 | 1.02 | 0.00 | 1.92 | 1.02 |
| Reimaging system D | 0.00 | 0.13 | 1.02 | 0.00 | −1.13 | 1.02 |

When the sensor pitch of the reimaging system C is taken as P, the sensor pitches of respective imaging systems are given in Table 13 (also, the sensor pitches of the reimaging systems A and B may be the same value, irrespective of the pitch P).

TABLE 13

| | |
|---|---|
| Reimaging system C | 1.000 × P |
| Reimaging system D | 1.983 × P |

Figure 30A:
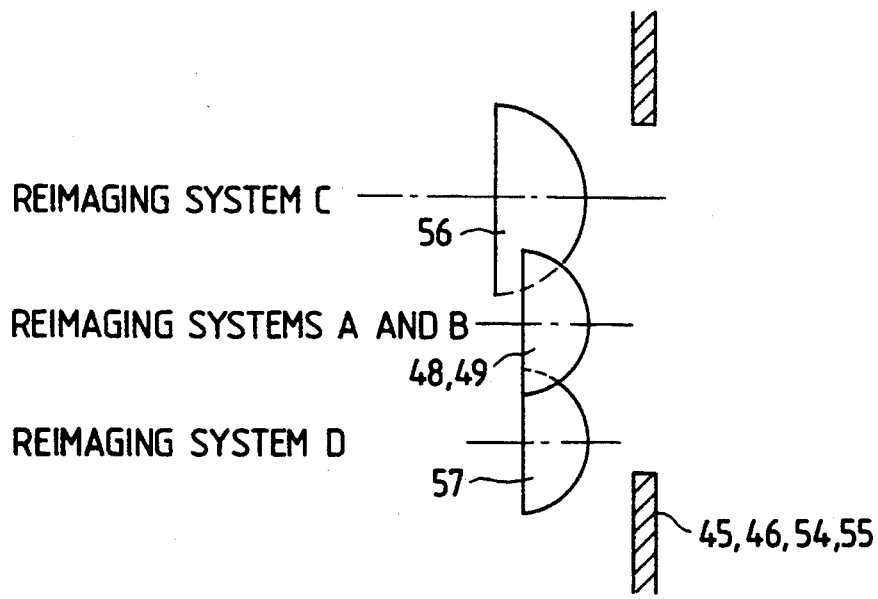
FIGS. 30A and 30B are views for explaining a ninth embodiment of the present invention.
Figure 30B:
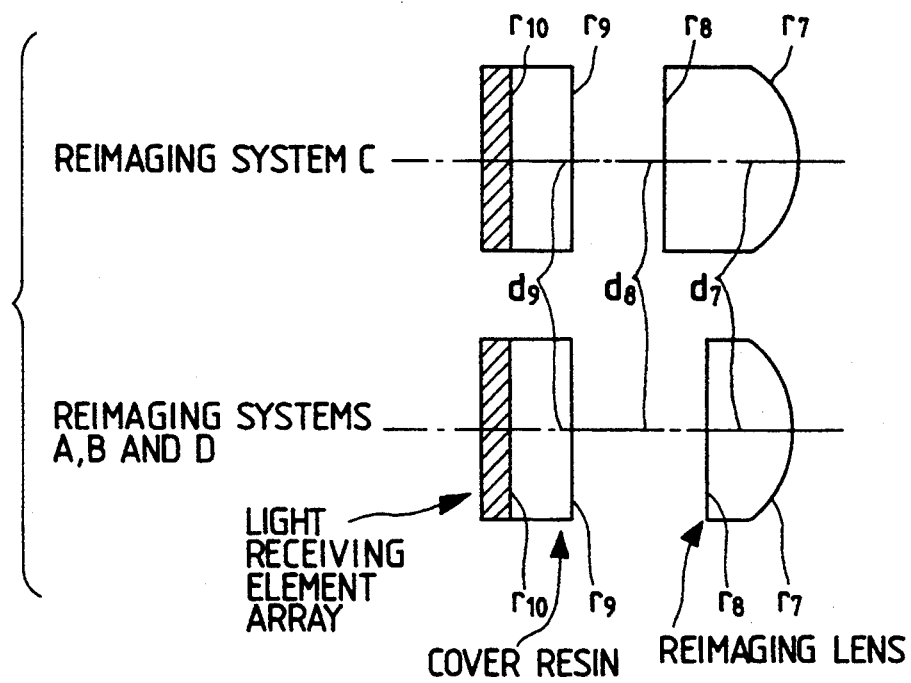

Referring to FIGS. 30A and 30B, the ninth embodiment of the focus detecting device according to the present invention is explained. The fundamental arrangement of the ninth embodiment is identical with that of the eighth embodiment, except that as shown in FIG. 30B, the reimaging systems A, B, and D are different from the reimaging system C in thickness of the reimaging lens. The following tables show the examples of numerical data of the ninth embodiment.

Table 14 gives the radii of curvature, lens spaces, and refractive indices of the reimaging systems A, C, and D. From tile numerical values in the seventh to ninth rows indicated in this table, the above difference between the thicknesses will be seen.

TABLE 14

| Surface No. | Radius of curvature | Space Reimaging system A | Space Reimaging system C | Space Reimaging system D | Refractive index |
|---|---|---|---|---|---|
| 1 | Equivalent imaging plane | 4.5 | 4.5 | 4.5 | 1.00000 |
| 2 | ∞ | 0.5 | 0.5 | 0.5 | 1.51805 |
| 3 | ∞ | 0.2 | 0.2 | 0.2 | 1.00000 |
| 4 | 8.3 | 3.0 | 3.0 | 3.0 | 1.52742 |
| 5 | −124.3 | 14.2 | 14.2 | 14.2 | 1.00000 |
| 6 | Stop | 0.1 | 0.1 | 0.1 | 1.00000 |
| 7 | 3.0 (r7) | 2.0 (d7) | 2.38(d7) | 2.0 | 1.52742 |
| 8 | ∞ (r8) | 6.2 (d8) | 5.82(d8) | 6.2 | 1.00000 |
| 9 | ∞ (r9) | 0.5 (d9) | 0.5 (d9) | 0.5 | 1.52742 |
| 10 | Light receiving surface (r10) | | | | 1.00000 |

Table 15 gives the positions of the optical axes of the reimaging lenses at a plane normal to the optical axis of the condenser lens including the position of the stop.

TABLE 15

| | | |
|---|---|---|
| Reimaging system A | y = 1.77 | z = 0.00 |
| Reimaging system B | y = −1.77 | z = 0.00 |
| Reimaging system C | y = 0.00 | z = 0.65 |
| Reimaging system D | y = 0.00 | z = −0.65 |

In Table 15, symbol y represents the directions of the light receiving element arrays.

Table 16 shows the numerical values representative of the shape of the stop where the opening is taken as the overlapping portion of a circle of a radius of curvature RL, with y=YL and z=ZL as its center, and another circle of a radius of curvature RU, with y=YU and z=ZU.

TABLE 16

| | YL | ZL | RL | YU | ZU | RU |
|---|---|---|---|---|---|---|
| Reimaging system A | 0.00 | 0.00 | 1.68 | 2.58 | 0.00 | 1.68 |
| Reimaging system B | −2.58 | 0.00 | 1.68 | 0.00 | 0.00 | 1.68 |
| Reimaging system C | 0.00 | 0.66 | 1.02 | 0.00 | 1.92 | 1.02 |
| Reimaging system D | 0.00 | 0.13 | 1.02 | 0.00 | −1.13 | 1.02 |

What is claimed is:

1. A focus detecting device including a focus detecting optical system comprising:
   a condenser lens disposed adjacent to a preset imaging plane of a photographic lens;
   an aperture stop having at least three openings arranged at positions which enable focusing accuracy of said system;
   at least three reimaging lenses arranged behind said aperture stop at positions corresponding to said at least three openings; and
   photoelectric converting means including light receiving element arrays located at positions at which images are to be re-formed by said at least three reimaging lenses, said photoelectric converting means being capable of detecting a phase difference between two output signals of output signals representative of intensity distribution of light derived from said photoelectric converting means, to thereby perform focus detection,
   said at least three reimaging lenses and said corresponding at least three openings in said aperture stop being arranged such that at least three light beams pass through the different regions of said photographic lens and traverse at least one common point on said preset imaging plane of said photographic lens to be received by said photoelectric converting means, wherein centers of said at least three openings are arranged in a substantially straight line, and wherein a vertex of at least one of said reimaging lenses is shifted away from said substantially straight line.

2. A focus detecting device including a focus detecting optical system comprising:
   a condenser lens disposed adjacent to a preset imaging plane of a photographic lens;

an aperture stop having a plurality of openings arranged at positions which enable focusing accuracy of said system;

a plurality of reimaging lenses arranged behind said aperture stop at positions corresponding to said plurality of openings; and photoelectric converting means including light receiving element arrays located at positions at which images are to be reformed by said plurality of reimaging lenses so that a plurality of light beams passing through different regions of said photographic lens is received by said photoelectric converting means, said photoelectric converting means being capable of detecting a phase difference between two output signals of output signals representative of intensity distribution of light derived from said photoelectric converting means to enable focus detection;

wherein centers of said plurality of openings are arranged in a substantially straight line, and wherein vertices of said plurality of reimaging lenses are shifted from said substantially straight line;

said plurality of light beams passing through the different regions of said photographic lens and traversing at least one common point on said preset imaging plane of said photographic lens to be received by said photoelectric converting means;

said focus detecting optical system including at least two sets of reimaging systems, the phase difference between the two output signals representative of the intensity distribution of light derived from said photoelectric converting means of reimaging systems corresponding to two entrance pupils for enabling focusing accuracy being detected for focus detection, at least one of said two sets of reimaging systems having entrance pupils disposed at different distances from an optical axis of said condenser lenses, and pitches of light receiving elements of said light receiving element arrays corresponding to said reimaging systems being different from each other.

3. A focus detecting device according to claim 2, wherein lengths of optical paths from said plurality of reimaging lenses to said light receiving element arrays are different from one another.

4. A focus detecting device according to claim 2, wherein distances between principal points of said plurality of reimaging lenses are different from one another.

5. A focus detecting device according to claim 2, wherein said at least two sets of reimaging systems include said light receiving element arrays having cover resin which is different in thickness.

6. A focus detecting device according to claim 2, wherein said at least two sets of reimaging systems include said reimaging lenses which are different in thickness.

7. A focus detecting device according to claim 1, wherein said focus detecting optical system includes at least two sets of reimaging systems, the phase difference between the two output signals representative of the intensity distribution of light derived from said photoelectric converting means of reimaging systems corresponding to two entrance pupils for ensuring focusing accuracy being detected for focus detection, an entrance pupil of at least one of said at least two sets of reimaging systems being disposed at a different distance from an optical axis of said condenser lens as compared with an entrance pupil of a remaining set of reimaging systems, and correcting means being provided for correcting the output signals from said light receiving element arrays so that a pitch of light receiving elements of at least one of said light receiving element arrays corresponding to said reimaging systems can be changed in a calculation to detect a phase difference between the output signals of remaining light receiving element arrays.

8. A focus detecting device according to claim 7, wherein said correcting means changes the pitch of the whole of the light receiving element array corresponding to at least one reimaging system.

* * * * *